US007568511B2

(12) United States Patent
Chojnacki et al.

(10) Patent No.: US 7,568,511 B2
(45) Date of Patent: Aug. 4, 2009

(54) SYNCHRONIZED STAMP APPLICATOR MACHINE AND METHOD OF OPERATING THE SAME

(75) Inventors: Andrzej Chojnacki, Alden, NY (US); Krzysztof P. Biernat, Lancaster, NY (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/246,277

(22) Filed: Sep. 18, 2002

(65) Prior Publication Data

US 2004/0045676 A1 Mar. 11, 2004

(51) Int. Cl.
*B32B 36/00* (2006.01)
*B32B 41/00* (2006.01)
*B65C 9/06* (2006.01)
*B65C 9/18* (2006.01)

(52) U.S. Cl. ................. 156/360; 156/541; 156/DIG. 2; 156/DIG. 3; 156/DIG. 4; 53/504; 53/382.1; 53/383.1

(58) Field of Classification Search ..................... 53/52, 53/75, 382.1, 383.1, 493, 504; 156/64, 350, 156/351, 360, 367, 378, 443, 556, 560, DIG. 3, 156/DIG. 4, DIG. 27, DIG. 37, 538–541, 156/566
See application file for complete search history.

(56) References Cited

U.S. PATENT DOCUMENTS

| | | | | | |
|---|---|---|---|---|---|
| 2,216,884 | A | * | 10/1940 | Kott | 53/127 |
| 3,496,048 | A | * | 2/1970 | Johnson et al. | 156/363 |
| 3,763,557 | A | | 10/1973 | Sewell | |
| 3,894,380 | A | * | 7/1975 | Poulsen | 53/75 |
| 4,265,355 | A | | 5/1981 | Davis | |
| 4,285,682 | A | * | 8/1981 | Moss | 493/316 |
| 4,317,319 | A | * | 3/1982 | Price | 53/76 |
| 4,664,740 | A | | 5/1987 | Wilkinson | |
| 4,969,305 | A | | 11/1990 | York et al. | |
| 5,168,883 | A | | 12/1992 | Winn | |
| 5,207,331 | A | * | 5/1993 | Teegarden et al. | 209/556 |
| 5,250,138 | A | * | 10/1993 | Szewczyk et al. | 156/350 |
| 5,657,855 | A | * | 8/1997 | Ferguson | 198/803.7 |
| 5,788,114 | A | * | 8/1998 | Perego | 221/11 |

* cited by examiner

*Primary Examiner*—Chris Fiorilla
*Assistant Examiner*—Chan P. Sing
(74) *Attorney, Agent, or Firm*—Schwartz & Weinrieb

(57) ABSTRACT

Apparatus and method for applying tax stamps to individual cigarette packages of different cigarette cartons having different height dimensions comprises a cigarette carton height determination station at which the height dimension of a particular cigaratte carton is determined. Such height dimension data is transmitted to a programmable logic controller (PLC), and the programmable logic controller (PLC) controls a single servo motor and linear actuator assembly, operatively connected to a support surface along which the cartons are movably disposed, so as to control the elevational level of the support surface whereby the cigarette cartons are always disposed at the proper elevational level with respect to various implements located at different operational stations.

39 Claims, 7 Drawing Sheets

SYNCHRONIZED STAMP APPLICATOR MACHINE AND METHOD OF OPERATING THE SAME

CROSS-REFERENCE TO RELATED PATENT APPLICATION

This patent application is related to U.S. patent application Ser. No. 10/037,386 which was filed on Dec. 21, 2001 in the name of Ronald Michalski and entitled LINEAR STAMP APPLICATOR MACHINE AND METHOD OF OPERATING THE SAME.

FIELD OF THE INVENTION

The present invention relates generally to apparatus, machines, or systems for applying, for example, tax stamps to individual packages of cigarettes contained within a carton of cigarettes, and more particularly to a new and improved machine, apparatus, or system, and a method of operating the same, for applying tax stamps to individual packages of cigarettes contained within a carton of cigarettes wherein the machine, apparatus, or system is capable of automatically handling differently sized cartons of cigarettes, comprising different brands of cigarettes produced by different cigarette manufacturers, as a result of the mechanisms comprising the cigarette carton opening station, the cigarette package stamping station, and the cigarette carton closing station being automatically adjustable.

BACKGROUND OF THE INVENTION

Machines, apparatus, or systems for applying, for example, tax stamps to individual packages of cigarettes contained within a carton of cigarettes are known in the art. An example of one such machine, apparatus, or system is disclosed within U.S. Pat. No. 4,265,355 which issued to Davis on May 5, 1981. In accordance with the operative structure comprising the disclosed machine, apparatus, or system, cartons of cigarettes are transported or conveyed by means of an infeed conveyor to an input platform or table, and subsequently, the cartons of cigarettes are further conveyed, moved, or routed through a carton separating stage, a carton flap opening stage, a carton flap fold-back stage, a cigarette package stamping stage, and a carton flap regiueing stage. If cartons having different length, different width, and/or different height dimensions are to be processed, various structural components or mechanisms comprising the various aforenoted cigarette carton and package processing stages or stations must be adjusted so as to in fact enable the machine, apparatus, or system to accommodate and process the cartons having such different length, width, and height dimensions. Unfortunately, in accordance with the structural arrangement or construction comprising the various interactive or interoperative components of the aforenoted machine, apparatus, or system of Davis, the adjustable structural components or mechanisms must be manually adjusted which is very time-consuming and tedious for operator personnel. As can therefore be readily appreciated, the throughput processing speed of the machine, apparatus, or system is relatively slow, and the throughput processing or output volume of the machine, apparatus, or system is relatively low.

In order to effectively improve upon the processing of differently-sized cigarette cartons within the aforenoted Davis machine or apparatus, the aforenoted system of Michalski was developed. Briefly, in accordance with the apparatus or system of Michalski, a sensing mechanism is disposed at a first station located at the upstream end portion of the machine or system whereby, for example, the height dimension of each cigarette carton is determined and the height dimension data, reflective of each individual cigarette carton, is transmitted to a program logic controller (PLC). The subsequent processing stations, located downstream from the first upstream cigarette carton sensing and height determination station, comprise appropriate operative components or means, for example, for opening the cigarette cartons, for stamping the individual cigarette packages contained within each cigarette carton, and for closing and resealing the cigarette cartons after the stamps have been applied to all of the cigarette packages within the cigarette cartons. In addition, suitable servo mechanisms are operatively associated with the particular operative components disposed at each one of the processing stations, and accordingly, when the program logic controller (PLC) transmits suitable data, indicative of the height dimensions characteristic of each particular cigarette carton, to each one of the servo mechanisms, the servo mechanisms adjust the respective operative components disposed at the processing stations such that the station components are optimally positioned with respect to the particular cigarette carton disposed at the particular processing station in order to permit the particular operative components to properly perform their particular operation upon the cigarette carton or packages. While the system of Michalski has been commercially successful, it has been determined that further improvements need to be implemented in connection with such a system in order to, for example, render the same operatively more efficient whereby the throughput processing volume can be increased, and in addition, the overall structural arrangement of the system can be simplified and rendered more economical.

For example, it has been noted that, in accordance with the system of Michalski, each individual carton of cigarettes needs to have its height dimension determined regardless of the fact, for example, that the particular carton of cigarettes may comprise one of several cartons of cigarettes of the same type or brand of cigarettes manufactured by the same manufacturer whereby all of the cigarette cartons will in have the same height dimension. In addition, as has been noted, each one of the cigarette carton opening, cigarette package stamping, and cigarette carton closing and re-sealing stations must have its own servo mechanism operatively disposed at each particular operational station, for receiving the height dimension data, which is characteristic of each cigarette carton and which has been previously entered into the memory of the program logic controller (PLC), so as to respectively control the disposition of the particular operational mechanism, located at such station, with respect to each incoming cigarette carton whereby each operation mechanism may properly perform its particular operation with respect to the particular cigarette carton.

Still further, in order to initially open the sealed cigarette cartons, the cigarette cartons are conveyed through a cigarette carton opening station at which a plow mechanism is disposed. Roller members are disposed immediately upstream of the plow mechanism so as to effectively squeeze the side portions of the cigarette carton together and thereby cause the top flaps of the carton to effectively assume a substantially "domed" configuration into which the plow mechanism can be moved so as to subsequently forcefully separate and open the bonded top carton flaps with respect to each other. It sometimes occurs, however, due, for example, to different stiffness parameters characteristic of different cigarette cartons, that the "domed" configuration is not always properly or sufficiently formed so as to in fact permit the plow mechanism to be properly inserted into the space defined beneath the bonded top carton flaps. At other times, the plow mechanism may in fact be properly inserted into the space defined beneath the upwardly "domed" top carton flaps, however, the adhesive bonding force defined between the top carton flaps is sometimes greater than the tear resistance defined between the top carton flaps and the remainder of the cigarette carton. Accordingly, upon insertion of the plow mechanism into the space defined beneath the upwardly "domed" top carton flaps, one or both of the top carton flaps is or are torn away from the remainder of the cigarette carton in lieu of the top carton flaps being properly separated and opened with respect to each other. This may also cause the processing line to become jammed which would, in turn, impact the throughput processing and volume capabilities of the stamp applicator machine or system.

A need therefore exists in the art for a new and improved machine, apparatus, or system for applying tax stamps to individual packages of cigarettes contained within a carton of cigarettes wherein the various interactive or interoperative components of the machine, apparatus, or system which comprise, or are positioned at, for example, the carton flap opening station, the cigarette package stamping station, and the carton flap closing station, are able to be automatically adjusted by means of a single servo unit such that the machine, apparatus, or system is rendered more economical to construct and implement, wherein there is no longer a need to necessarily scan each incoming cigarette carton for its particular size or height dimension such that the throughput processing speed of the machine, apparatus, or system is enhanced, wherein both the opening and closing operations performed upon the cigarette cartons are substantially simplified, optimized, and reliably ensured, and wherein jamming of the machine, apparatus, or system at any particular operation station can be readily rectified such that the throughput processing or output volume of the machine, apparatus, or system is not adversely affected and is enhanced as compared to conventional stamp applicator machines.

OBJECTS OF THE INVENTION

Accordingly, it is an object of the present invention to provide a new and improved machine, apparatus, or system for applying tax stamps to individual packages of cigarettes contained within a carton of cigarettes.

Another object of the present invention is to provide a new and improved machine, apparatus, or system, for applying tax stamps to individual packages of cigarettes contained within a carton of cigarettes, which effectively overcomes the various operational drawbacks or disadvantages characteristic of PRIOR ART stamp applicator machines, apparatus, or systems.

An additional object of the present invention is to provide a new and improved machine, apparatus, or system for applying tax stamps to individual packages of cigarettes contained within a carton of cigarettes wherein the various operational stations, and operational procedures performed at such stations, are synchronized so as to significantly enhance the operational speed and throughput processing volume capabilities of the machine, apparatus, or system.

A further object of the present invention is to provide a new and improved machine, apparatus, or system for applying tax stamps to individual packages of cigarettes contained within a carton of cigarettes wherein access means are provided at each one of the various operational stations such that any jamming which may occur at any one of the various operational stations can be readily rectified so as to effectively minimize processing line downtime and thereby maintain enhanced throughput processing volume capabilities of the machine, apparatus, or system.

A last object of the present invention is to provide a new and improved machine, apparatus, or system, for applying tax stamps to individual packages of cigarettes contained within a carton of cigarettes, which is economical to manufacture and construct.

SUMMARY OF THE INVENTION

The foregoing and other objectives are achieved in accordance with the teachings and principles of the present invention through the provision of a new and improved apparatus, machine, or system, for applying tax stamps to individual packages of cigarettes contained within a carton of cigarettes, wherein the new and improved apparatus, machine, or system comprises a plurality of operational stations at which different operational procedures are adapted to be performed upon each cigarette carton and/or the individual packages of cigarettes contained within the cigarette cartons. More particularly, for example, a cigarette carton infeed station serially feeds the cigarette cartons toward a cigarette carton sensing station which senses the presence of a first one of a first set cigarette cartons and determines the height dimension of such first cigarette carton. The sensing station has a gate mechanism which is opened when the height dimension of the first cigarette carton of the first set of cigarette cartons is determined, and all cartons having the same height dimension can be continuously conveyed into and through the carton sensing station due to the fact that once the particular height dimension characteristic of all similarly sized cigarette cartons has been determined, no further height dimensional sizing for each individual cigarette carton needs to be implemented. When a second set of cigarette cartons, having, for example, a height dimension which is different from that of the first set of cigarette cartons, is to be processed, then the time that it normally requires an operator to introduce the differently sized, second set of cigarette cartons onto the infeed conveyor for conveyance toward the sensing station usually comprises a sufficient predetermined period of time, such as, for example, approximately three seconds, whereby the machine, apparatus, or system, effectively sensing such a delay in connection with the further processing of cigarette cartons, is automatically disposed in a reset mode whereby a new height dimension, characteristic of the subsequently conveyed second set of cigarette cartons, must be determined in order to actuate the gate mechanism for permitting processing of the second set of cigarette cartons to proceed.

Once the cigarette cartons have had their height dimensions determined, such dimensional data is entered into the memory of a program logic controller (PLC). Downstream from the cigarette carton sensing station, there is located a cigarette carton flap unsealing station at which a cutting mechanism is utilized to sever the original adhesive bond defined between the top flap members of the cigarette carton, a plow station at which the top flap members are actually opened to their desired positions so as to readily permit access thereto by means of suitable stamp application mechanisms located at a downstream stamping station, and top flap reclosing and sealing stations at which the top flaps of the cigarette cartons are properly positioned so as to permit a suitable adhesive to be applied thereto, and wherein the top flaps are then closed and maintained in such position so as to permit the adhesive to cure and set. Pivotal access doors are also positioned at the various operational stations so as to readily permit access to a particular one of the cigarette cartons, and removal of the same if necessary, so as to effectively limit operational downtime.

In accordance with a unique and novel feature characteristic of the present invention, all of the operational stations are disposed in fixed positions, however, the cigarette cartons are movably conveyed atop an upper support surface or leg of a substantially inverted L-shaped rail member which is adapted to be moved vertically upwardly and downwardly by means of a single servo mechanism and an operatively associated linear actuator. Actuation of the single servo mechanism and linear actuator is controlled by means of the program logic controller (PLC) in accordance with suitable signals, transmitted by the program logic controller (PLC) to the servo mechanism and its linear actuator, which are indicative of the originally sensed height dimensions characteristic of, and unique to, the different sets of cigarette cartons. In this manner, the different sets of cigarette cartons will always be disposed at a predeterminedly correct elevational position with respect to the various operational stations of the machine, apparatus, or system of the present invention. Accordingly, not only does the cigarette package stamp applicator system of the present invention satisfy the requisite versatility requirements for processing cigarette cartons having different height dimensions, but in addition, the system is simplified in that the disposition of the cigarette cartons with respect to the various operational stations is adjusted by means of a single servo mechanism as opposed to requiring the operational components of each operational station to be positionally adjusted by means of its own servo mechanism.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 4, are fully opened with respect to each other in preparation for the application of a stamp to each one of the individual cigarette packages disposed within each cigarette carton;

DETAILED DESCRIPTION OF THE PREFERRED EMBODIMENT

Figure 1:
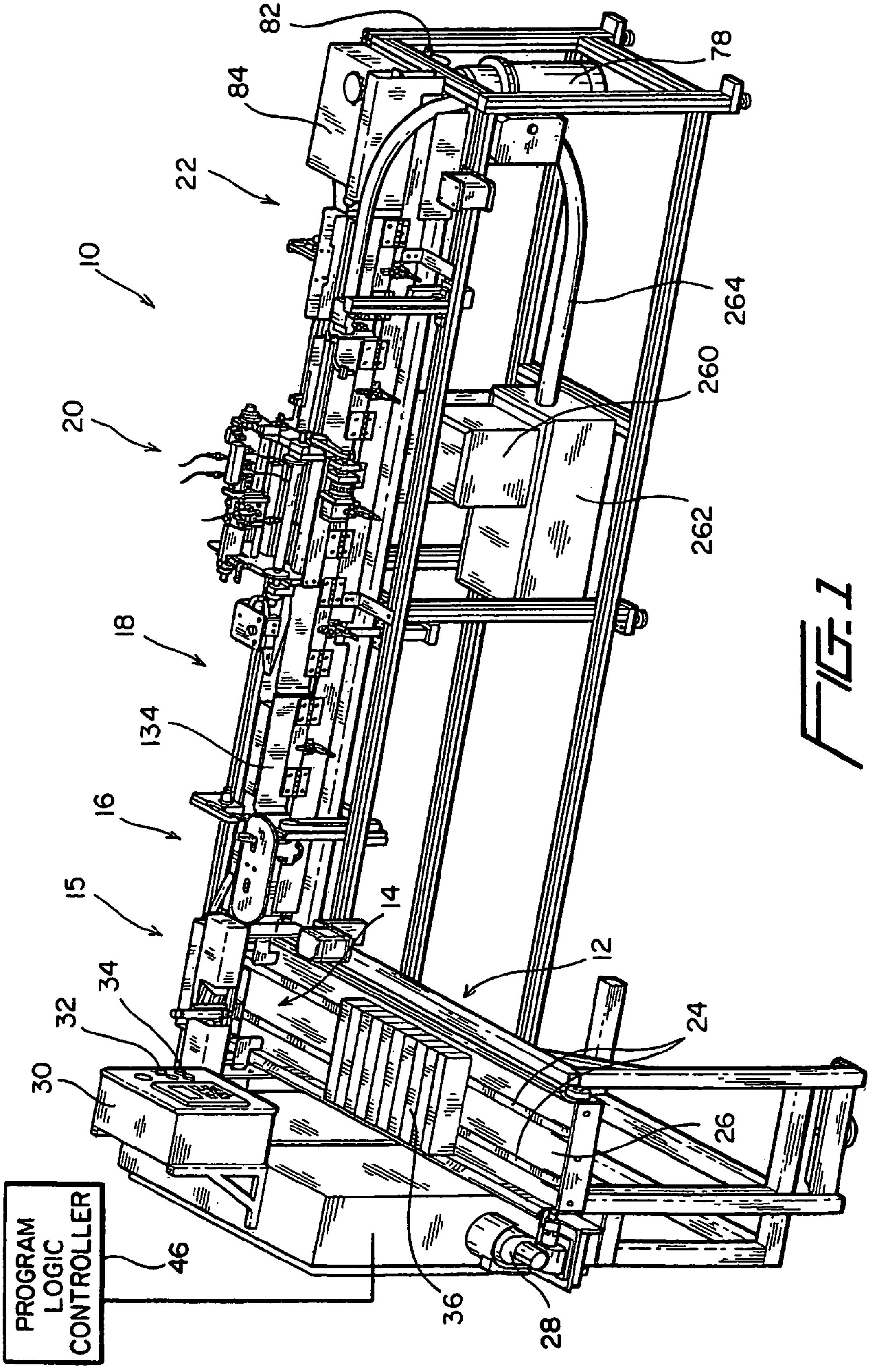
FIG. 1 is a perspective view of the new and improved synchronized stamp applicator machine, apparatus, or system as constructed in accordance with the principles and teachings of the present invention and showing the operative components thereof which effectively define a processing line comprising the plurality of different processing or operational stations at which the various operations are to be performed in conjunction with each one of the cigarette cartons or in conjunction with each one of the cigarette packages contained within the cigarette cartons.

Referring now to the drawings, and more particularly to FIG. 1 thereof, a new and improved synchronized stamp applicator machine, apparatus, or system, constructed in accordance with the principles and teachings of the present invention, is disclosed and is generally indicated by the reference character 10. As will be more fully appreciated from the detailed description which follows, the new and improved synchronized stamp applicator machine, apparatus, or system 10 is seen to comprise a processing or operational line comprising a plurality of longitudinally spaced processing or operational stations at which various operations are respectively performed in connection with, or upon, each one of the cigarette cartons, or upon each one of the individual cigarette packages contained within the cigarette cartons. More particularly, for example, in accordance with a brief but non-limiting overview or perspective of the processing or operational line of the synchronized stamp applicator machine or system 10 of the present invention, it is to be appreciated that the new and improved synchronized stamp applicator machine, apparatus, or system 10 of the present invention is seen to comprise a cigarette carton infeed station 12 at which cigarette cartons are fed into the machine, apparatus, or system 10 for the stamp application processing thereof, a cigarette carton sensing and height determination station 14 for determining the height dimension of, for example, each set of cigarette cartons having the same height dimension, and a cigarette carton loading station 15 at which the cigarette cartons are adapted to be engaged by means of a longitudinally oriented transport mechanism which will serially transport the cigarette cartons from one processing station to a subsequent processing station located along the processing line.

Accordingly, once a particular cigarette carton is disposed at the cigarette carton loading station 15, it is adapted to be engaged by a suitable conveying member of the transport mechanism for continued conveyance through the stamp applicator machine, apparatus, or system 10 of the present invention so as to be serially processed at the various processing stations of the machine, apparatus, or system 10. In particular, then, each cigarette carton will be serially transported to a cigarette carton top flap member unsealing station 16 for severing the original adhesive bond defined between the top flap members of each cigarette carton whereby the top flap members of the cigarette carton will be disposed in a partially open state, a cigarette carton top flap opening station 18 at which the partially opened top flap members of each cigarette carton are fully opened by means of a plow mechanism in preparation for the application of a stamp to each one of the individual cigarette packages disposed within each cigarette carton, a cigarette package stamp applicator station 20 at which a stamp is applied to each one of the cigarette packages contained within each one of the cigarette cartons, and a cigarette carton top flap closing and re-sealing station 22 at which each one of the cigarette cartons, having had stamps applied to each one of the individual cigarette packages contained therein, now has the smaller top flap member folded to its closed position, a suitable adhesive material is applied to an underside portion of the larger top flap member, the larger top flap member is subsequently folded over the smaller top flap member, and the adhesively bonded top flap members are maintained or held in their overlapped position so as to permit the adhesive material to cure and set.

Figure 2:
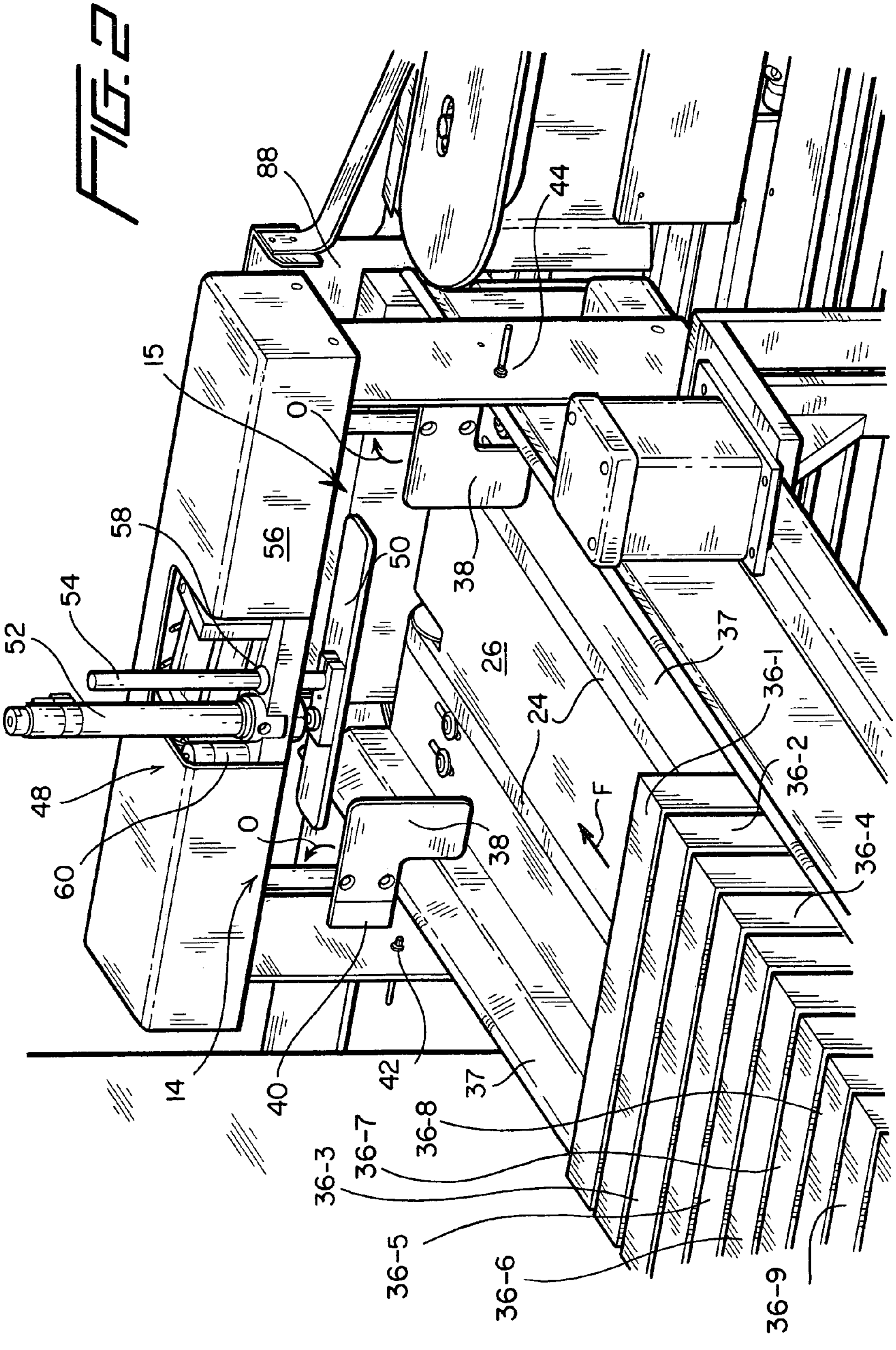
FIG. 2 is a perspective view showing the cigarette carton infeed station and the cigarette carton sensing and height determination station of the processing or operational line of the new and improved synchronized stamp applicator machine, apparatus, or system of the present invention as disclosed within FIG. 1.

With reference now being made to FIGS. 1 and 2, the details of the cigarette carton infeed station 12 and the cigarette carton sensing and height determination station 14 will now be described. More particularly, the cigarette carton infeed station 12 comprises an infeed conveyor comprising a pair of laterally spaced conveyor belts 24 which are operatively integrated within a cigarette carton infeed table 26 and are adapted to be continuously driven by means of a suitable motor drive 28 disposed adjacent to the infeed table 26. An operator console or control panel 30 is also disposed immediately adjacent to the cigarette carton infeed station 12 and the cigarette carton sensing and height determination station 14, and the console or control panel 30 may have, for example, START and STOP buttons 32,34 upon the front face thereof for controlling the motor drive 28. Accordingly, it can be further appreciated that when a plurality of cigarette cartons 36 are manually placed upon the cigarette carton infeed table 26 by means of operator personnel, and are effectively laterally confined between oppositely disposed side walls 37 of the infeed table 26, the conveyor belts 24 will effectively convey or transport the plurality of cigarette cartons 36 toward the cigarette carton sensing and height determination station 14. As may best be appreciated from FIG. 2, the cigarette carton sensing and height determination station 14 is seen to comprise a pair of laterally spaced gate members 38 which are pivotally mounted upon suitable mounting brackets 40, only one of which is visible in FIG. 2, so as to be movable, by means not shown, between first relatively CLOSED positions at which the gate members 38,38 effectively block further advancement of the cigarette cartons 36 along the infeed table 26, and second relatively OPENED positions to which the gate members 38,38 have been pivoted in the directions of the arrows O so as to in fact permit the cigarette cartons 36 to be conveyed beyond the gate members 38,38 and thereby be readied for further processing within the apparatus, machine, or system 10 of the present invention.

Prior to such further processing of the cigarette cartons 36 within the machine, apparatus, or system 10 of the present invention, the gate members 38,38 are initially disposed at their first relatively CLOSED illustrated positions whereby, as a result of the conveyance of the cigarette cartons 36 along the infeed table 26 by means of the infeed conveyor belts 24 and in the conveyance direction F, the first or leading one of the cigarette cartons 36-1 will encounter the gate members 38,38 such that further conveyance of the cigarette cartons 36 is temporarily halted whereby the first or leading one of the cigarette cartons 36-1 will be disposed at a height determination position. A suitable sensor assembly, such as, for example, a photodetector assembly comprising a phototransmitter 42 and a coaxially aligned photoreceiver 44, is disposed immediately upstream of the gate members 38,38, as considered in the conveyance direction F of the cigarette cartons 36, so as to detect the presence of the first or leading one of the cigarette cartons 36-1 when the first or leading one of the cigarette cartons 36-1 encounters the gate members 38,38 and is disposed at the height determination position. Upon detecting the presence of the first or leading one of the cigarette cartons 36-1, the photodetector assembly 42,44 will transmit a suitable signal to a program logic controller (PLC) 46, which is disposed immediately adjacent to the infeed table 26 as best seen in FIG. 1, and the program logic controller (PLC) 46, in turn, will transmit a suitable control signal to a cigarette carton height determination mechanism or assembly 48.

More particularly, the cigarette carton height determination mechanism or assembly 48 is seen to comprise a cigarette carton height determination plate 50 which is mounted upon the lower end portion of, for example, a pneumatically-driven piston-cylinder assembly 52 such that the cigarette carton height determination plate 50 can be moved vertically upwardly and downwardly so as to be adjustably moved into engagement with the upper or top side portion of, for example, the first or leading one of the cigarette cartons 36-1 disposed at the height determination position. The cigarette carton height determination plate 50 also has a vertically upstanding guide rod 54 fixedly mounted thereon such that the vertically adjusted movements of the cigarette carton height determination plate 50, as controlled by means of the piston-cylinder assembly 52, can be properly guided and stabilized. The cylinder member of the pneumatically-driven piston-cylinder assembly 52 is fixedly mounted within a height determination station housing 56, and a bearing member 58 is likewise fixedly mounted within the housing 56 so as to permit the height determination plate guide rod 54 to undergo vertically oriented slidable or linear movements with respect thereto. Still further, a suitable distance sensor mechanism 60, such as, for example, an ultrasonic sensor, is likewise fixedly mounted within the housing 56, and accordingly, when the pneumatically-driven piston-cylinder assembly 52 lowers the cigarette carton height determination plate 50 into engagement with the upper or top side portion of the first or leading one of the cigarette cartons 36-1 in response to the control signal issued by means of the program logic controller (PLC) 46, the ultrasonic sensor 60 can determine the distance of the height determination plate 50 from the sensor 60.

Since the distance defined between the sensor 60 and the upper surface portion of the cigarette carton infeed table 26, upon which the cigarette cartons 36 are being conveyed, is known as a result of having been predetermined or preset, the ultrasonic sensor mechanism 60 can readily determine the height dimension of the particular cigarette carton 36-1 disposed at the height determination position. Accordingly, this cigarette carton height information or data is transmitted from the ultrasonic sensor 60 to the program logic controller (PLC) 46 for storage therein as well as for subsequent usage and control processing. For example, after the height dimension of the first or leading one of the cigarette cartons 36-1 has been determined, the program logic controller (PLC) 46 will transmit another control signal to the actuating mechanisms, not shown, controlling the pivotal movements of the gate members 38,38 so as to cause the gate members 38,38 to be moved to their relatively OPENED positions. Therefore, the conveyor belts 24,24 are now able to further convey the cigarette cartons 36 to a position downstream from the height determination station 14 such that the first or leading one of the cigarette cartons 36-1 is now disposed at the cigarette carton loading station 15. In addition, the program logic controller (PLC) 46 also uses such cigarette carton height dimension data stored within its memory to properly pre-position or pre-dispose a support mechanism, upon which each one of the cigarette cartons 36 is disposed for transportation from the cigarette carton loading station 15 to each one of the serially spaced processing stations 16–22 by means of the transport mechanism, at a predeterminedly proper elevational level.

Figure 3:
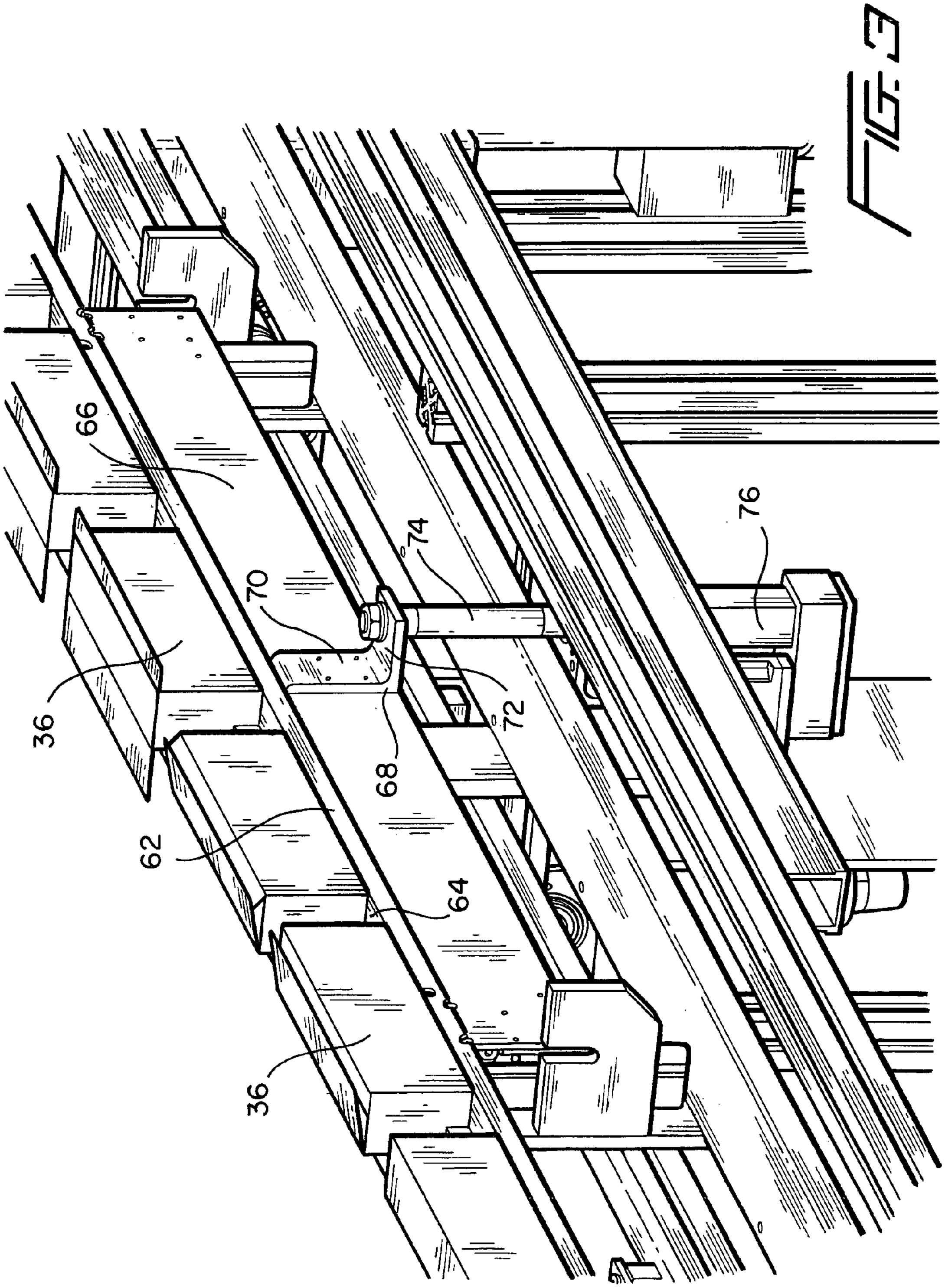
FIG. 3 is a perspective view of the single servo mechanism and linear actuator assembly utilized within the new and improved synchronized stamp applicator machine, apparatus, or system of the present invention in order to adjustably elevate, either upwardly or downwardly, the disposition of the rail member upon which the cigarette cartons are conveyed from station to station of the machine or system processing line as disclosed within FIG. 1, the various operative components of the various stations having been omitted for clarity purposes.

In this manner, when each one of the cigarette cartons 36 is consecutively moved to each one of the serially arranged operational or processing stations 16–22, the cigarette cartons 36 will be disposed at proper elevational levels so as to be properly engaged by and acted upon by means of the various operational components disposed at the various processing or operational stations 16–22. More particularly, as can best be appreciated from FIG. 3, the support mechanism, upon which each one of the cigarette cartons 36 is disposed for transportation to each one of the serially spaced processing stations 16–22 by means of the transport mechanism, comprises a rail member 62 which comprises a horizontally disposed leg or member defining a horizontally disposed support surface 64 upon which all of the plurality of cigarette cartons 36 are movably supported while being transported from between the various processing stations 16–22, and a vertically disposed leg or member, not shown for clarity purposes, upon which a vertically oriented mounting plate 66 is fixedly secured. A substantially L-shaped mounting bracket 68 is adapted to be fixedly mounted upon the mounting plate 66 by means of its vertically oriented leg member 70, while the horizontally oriented leg member 72 projects outwardly away from the mounting plate 66 a predetermined distance so as to be capable of fixedly mounting the upper end portion of a linear actuator component 74 of a servo mechanism 76 therein. The servo mechanism 76 is adapted to receive cigarette carton height dimension data information signals from the program logic controller (PLC) 46, and accordingly, it can be readily appreciated that when particular cigarette carton height dimension data information signals are transmitted from the program logic controller (PLC) 46 to the servo mechanism 76, the servo mechanism 76 will actuate the linear actuator 74 so as to precisely extend or retract the linear actuator 74 which in turn correspondingly moves the support rail member 62.

In this manner, the elevational level or disposition of the upper, horizontally disposed support surface 64 of the support rail member 62 is disposed at precisely the correct elevational level so as to, in turn, dispose the cigarette cartons 36 at precisely the correct or proper elevational level with respect to the various operational components disposed at the various operational or processing stations 16–22 whereby such various operational components of the various operational or processing stations 16–22 can in fact properly perform their particular operations upon the cigarette cartons 36 or the cigarette packages located within each cigarette carton 36. Accordingly, the various operational components, which are all disposed at the various operational or processing stations 16–22 so as to be positioned at the same elevational level with respect to each other, can properly engage the cigarette cartons 36, or the cigarette packages contained within each one of the cigarette cartons 36, as a result of the elevational adjustment of the rail member 62 by means of the servo mechanism 76 and linear actuator 74, so as to perform their various operational procedures upon the cigarette cartons 36, or upon the cigarette packages contained within each one of the cigarette cartons 36, without, for example, causing any structural damage to the cigarette cartons 36, or to any of the cigarette packages contained within the cigarette cartons 36, or without causing jamming of the cigarette cartons 36 within or along the processing line.

It is to be additionally noted that, in conjunction with a plurality or group of cigarette cartons 36, all of which have the same height dimension, once the height dimension of the leading one of the cigarette cartons 36-1, which is being conveyed along the infeed table 26, has been determined by means of the height determination sensor 60, the height dimensions of the remaining cigarette cartons 36 need not be determined, and in this manner, the cigarette carton processing is rendered continuous and needless height dimension determination processing of every cigarette carton is effectively eliminated whereby overall processing time of the cigarette cartons is minimized. This continuous processing is ensured by means of a suitable cigarette carton sensor which is not shown but which may be similar to the photodetector assembly 42,44. The cigarette carton sensor is fixedly mounted upon the upper support surface 64 of the rail member 62 and is located at the cigarette carton loading station 15. Therefore, as the cigarette cartons 36 are continuously fed into the cigarette carton loading station 15, the cigarette carton sensor, not shown, senses the consecutive presence of the serially conveyed cigarette cartons 36 and transmits a suitable signal to the program logic controller (PLC) 46 which, in turn, continuously transmits control signals to the actuating mechanisms, not shown, which control the pivotal movements of the gate members 38,38 so as to maintain the gate members 38,38 in their relatively OPENED positions.

If, however, the cigarette carton sensor does not in fact detect the presence of a cigarette carton at the cigarette carton loading station 15 within a predetermined period of time, then a suitable signal is sent to the program logic controller (PLC) 46 whereby the program logic controller (PLC) 46 in turn transmits a suitable signal to the actuating mechanisms, not shown, which control the pivotal movements of the gate members 38,38 so as to now dispose the gate members 38,38 in their relatively CLOSED positions. Accordingly, a new height determination processing cycle must now be initiated in connection with, for example, a new or different group or plurality of cigarette cartons 36 which have height dimensions which are different from those of the previously processed group of cigarette cartons. Such a discontinuity in connection with the conveyance of the cigarette cartons 36 along the infeed table 26 normally only occurs when a different set or group of cigarette cartons, having different height dimensions from those of a previously conveyed group or set of cigarette cartons, are to be conveyed along the infeed table 26. More particularly, the time that is normally required for operator personnel to effectively load the new group or set of cigarette cartons 36, having height dimensions which are different from those of the previously processed group or set of cigarette cartons, onto the infeed table 26 will be sufficient for the cigarette carton sensor, located at the cigarette carton loading station 15, to sense the absence of a cigarette carton at the cigarette carton loading station 15 for the predetermined period of time and to effectively instruct the program logic controller (PLC) 46 to cause the gate members 38,38 to be moved to their CLOSED positions.

Continuing further, and with reference being made to FIGS. 1–5, in addition to the cigarette carton sensor, not shown, being operatively connected to program logic controller (PLC) 46, the cigarette carton sensor is also operatively connected to a suitable drive motor 78 which is best seen in FIG. 1. The drive motor 78 is, in turn, operatively connected to a longitudinally movable transfer mechanism 80 as well as to a rotary accessory shaft 82 through means of a suitable transmission or the like 84. A part of the transfer mechanism 80 can be seen in FIG. 5, and the extreme right end of the accessory shaft 82 can likewise best be seen in FIG. 1, and it is to be appreciated that both the transfer mechanism 80 and the accessory shaft 82 extend the entire length of the apparatus, machine, or system 10 as defined by means of the various operational or processing stations 15–22. The longitudinally movable transfer mechanism 80 may comprise any suitable longitudinally extending conveyor, such as, for example, a chain drive mechanism, and a plurality of carton pusher or conveying implements 86 are disposed at predetermined equally spaced locations upon the chain drive transfer mechanism 80 as can also best be seen from FIG. 5. The carton pusher or conveying implements 86 project forwardly from the chain drive transfer mechanism 80, and the spacing between consecutive carton pusher or conveying implements 86 defines a predetermined pitch such that the carton pusher or conveying implements 86 can respectively engage the cigarette cartons 36 in a serial manner so as to longitudinally transfer or transport the same from the cigarette carton loading station 15 to the downstream operational or processing stations 16–22 which are likewise spaced the same predetermined distances apart.

In particular, after the conveyor belts 24,24 have transferred the cigarette cartons 36 toward the cigarette carton height determination station 14, and after the height dimension of the leading one of the cigarette cartons 36-1 has been determined whereby the gate mechanisms 38,38 have been moved to their OPENED positions, the leading one of the cigarette cartons 36-1 is conveyed toward the downstream end portion of the infeed table 26. Upon reaching the downstream end portion of the infeed table 26, the leading one of the cigarette cartons 36-1 will effectively drop off the downstream end portion of the infeed table 26 and onto the horizontally disposed support surface 64 of the rail member 62 so as to also engage a backstop member 88 which facilitates the proper disposition of each one of the cigarette cartons 36 onto the horizontally disposed support surface 64 of the rail member 62. Accordingly, since the leading one of the cigarette cartons 36-1 is now disposed upon the horizontally disposed support surface 64 of the rail member 62, the cigarette carton sensor, not shown, will detect the presence of the leading one of the cigarette cartons 36-1 at the cigarette carton loading station 15 so as to activate the drive motor 78 whereby the transfer mechanism 80 is driven such that the first or leading one of the cigarette cartons 36-1 is now transferred from the cigarette carton loading station to the cigarette carton top flap member unsealing station 16. Successive ones of the cigarette cartons 36 are conveyed and transferred in a similar manner, however, in the absence of cigarette cartons, and the detection of such absence state by the cigarette carton sensor at the cigarette carton loading station 15, the operations of the drive motor 78, the longitudinal movement of the transfer mechanism 80, and the rotary movement of the accessory shaft 82, are all terminated.

Figure 4:
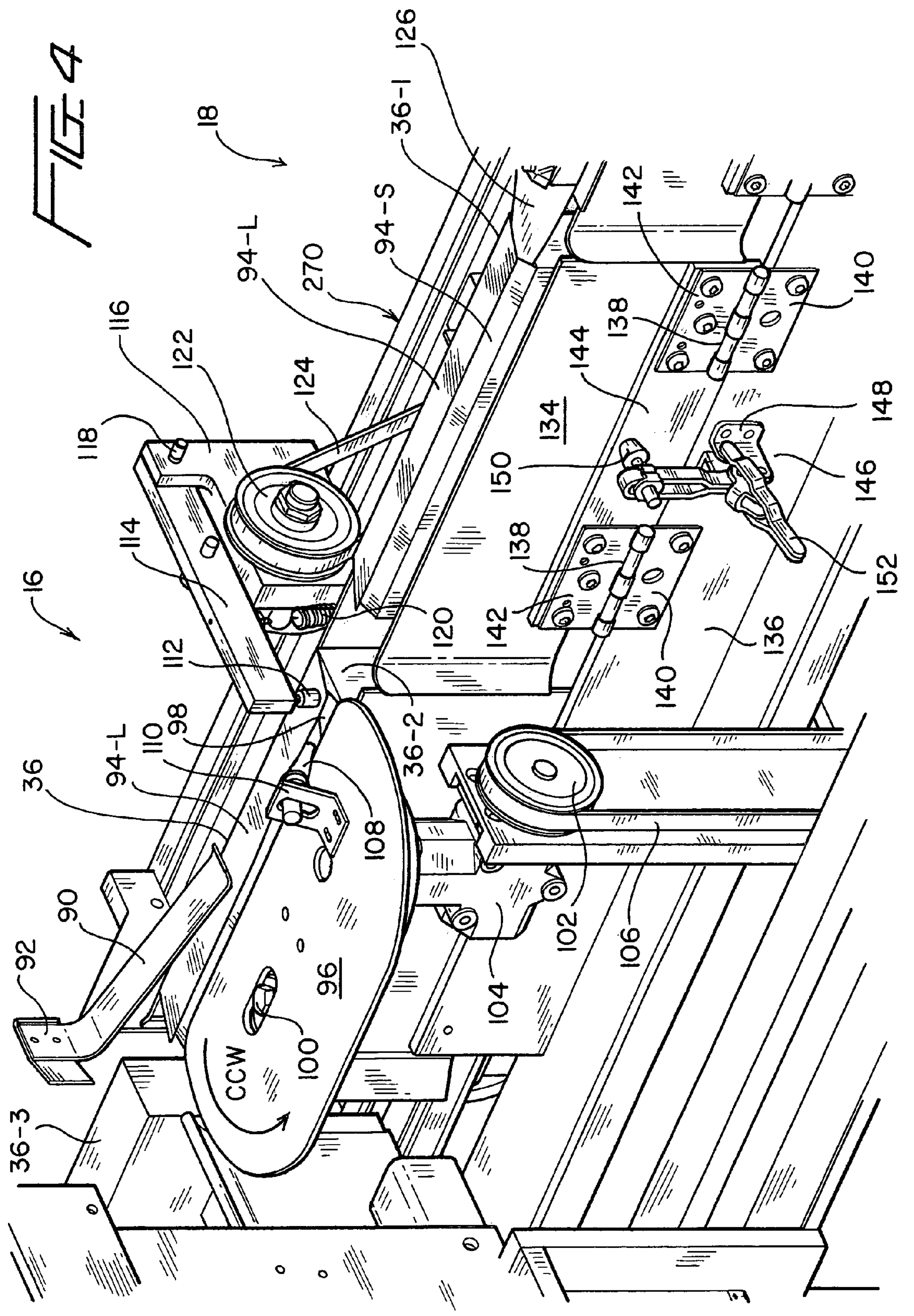
FIG. 4 is a perspective view of the cigarette carton top flap unsealing station, of the processing or operational line of the new and improved synchronized stamp applicator machine, apparatus, or system of the present invention as disclosed within FIG. 1, at which the top flap members of the cigarette carton are initially opened or separated from each other by means of a suitable cutting mechanism which severs the initial or original adhesive bond defined between the overlapped top flap members of the cigarette carton.

With reference now being made to FIGS. 1 and 4, the details of the cigarette carton top flap member unsealing station 16 will be described. Each successive cigarette carton 36, having been previously disposed at the cigarette carton loading station 15, is next moved, transferred, or conveyed from the cigarette carton loading station 15 to the cigarette carton top flap member unsealing station 16 so as to have the adhesive seal or bond, originally maintaining the top flap members of each cigarette carton 36 in their CLOSED positions with respect to each other, effectively broken in preparation for the top flap members of each cigarette carton 36 to be moved to their fully OPENED positions so as to in turn enable the cigarette packages contained within each cigarette carton 36 to have stamps applied thereto. More particularly, as each one of the cigarette cartons 36 enters the cigarette carton top flap member unsealing station 16, a leaf spring member 90, mounted in a cantilevered manner upon a suitable mounting bracket 92, loosely engages the upper or outer surface of the larger top flap member 94-L of the cigarette carton 36 so as to simply help maintain the cigarette carton 36 in a stabilized state upon the upper surface portion 64 of the rail member 62. As has been noted, the larger and smaller top flap members 94-L and 94-S are disposed in their relatively CLOSED positions, however, each cigarette carton 36 is conveyed to a predetermined finalized position within the cigarette carton top flap member unsealing station 16 at which the cigarette carton 36 is stopped such that the top flap members 94-L, 94-S can now be effectively unsealed and disposed at their partially OPENED positions with respect to each other.

In order to therefore unseal and disposed the top flap members 94-L,94-S of each cigarette carton 36 at their partially OPENED positions, a support plate 96 is fixedly disposed at the cigarette carton top flap member unsealing station 16, and a drive chain, not shown, is drivingly disposed beneath the support plate 96 along a substantially oval or elliptical locus. A cutter blade implement 98 is fixedly mounted upon the drive chain, and accordingly, when the drive chain is driven in a counterclockwise direction CCW, the cutter blade implement 98 is utilized to sever the adhesive seal defined between the cigarette carton top flap members 94-L,94-S. The drive chain is drivingly mounted upon a pair of laterally spaced drive chain sprocket members, the rotary shaft of one of the sprocket members being illustrated at 100, and in order to drivingly rotate the sprocket members, a drive pulley system, one of the drive pulleys being shown at 102, is operatively connected to the drive chain through means of a gear drive disposed within a gear housing 104. One looped end of a first pulley belt 106 is drivingly disposed around the drive pulley 102, and the other looped end, not shown, of the first pulley belt 106 is disposed around the accessory drive shaft 82. In this manner, as the accessory drive shaft 82 is rotated, the chain drive, and therefore the cutter blade implement 98, is rotated along the elliptical locus as a result of the operative connections of the first pulley belt 106, drive pulley 102, and the gear drive disposed within gear housing 104.

In order to facilitate the insertion of the cutter blade implement 98 into the interstice or space defined between the larger and smaller top flap members 94-L,94-S of each cigarette carton 36 when a particular one of the cigarette cartons 36 is disposed at the cigarette carton top flap member unsealing station 16, several auxiliary implements are also disposed at the cigarette carton top flap member unsealing station 16. More particularly, an air nozzle 108 is fixedly mounted upon the support plate 96 by means of a mounting bracket 110, and it is noted that the air nozzle 108 is oriented at a predetermined angle such that the air issuing from the air nozzle 108 will be directed toward the interstice or space defined between the cigarette carton top flap members 194-L,194-S. In addition, a suction cup 112 is mounted upon a support arm 114 which is pivotally mounted upon a support block 116 by means of a pivot pin 118. A spring member 120 operatively interconnects the support arm 114 to a framework portion, not shown, of the cigarette carton top flap member unsealing station 16 so as to normally dispose or bias the support arm 114, and therefore the suction cup 112, toward a downward or lowered position such that the suction cup 112 is disposed at an elevational level which is immediately above the larger top flap member 94-L of the cigarette carton 36 disposed at the cigarette carton top flap member unsealing station 16.

A drive pulley 122 is rotatably mounted upon the support block 116, and a second pulley belt 124 has one looped end thereof disposed around the drive pulley 122 while another looped end, not shown, of the second pulley 124 is operatively disposed around the accessory drive shaft 82. A suitable cam mechanism, also not shown, is driven by means of the second pulley 124 and is operatively engaged with the support arm 114 such that as the drive pulley 122 undergoes rotation, a predetermined portion of the cam mechanism will cause the upward elevation of the support arm 114. This upward movement of the support arm 114 is also appropriately timed with the actuation of a suitable vacuum acting through the suction cup 112, as well as pressurized air flowing through the air nozzle 108, such that the larger top flap member 94-L of the cigarette carton 36 is lifted to a sufficient extent so as to permit the insertion of the cutter blade implement 98 into the interstice or space defined between the cigarette carton top flap members 94-L, 94-S so as to engage and sever the adhesive bond defined between the top flap members 94-L,94-S.

Figure 5:
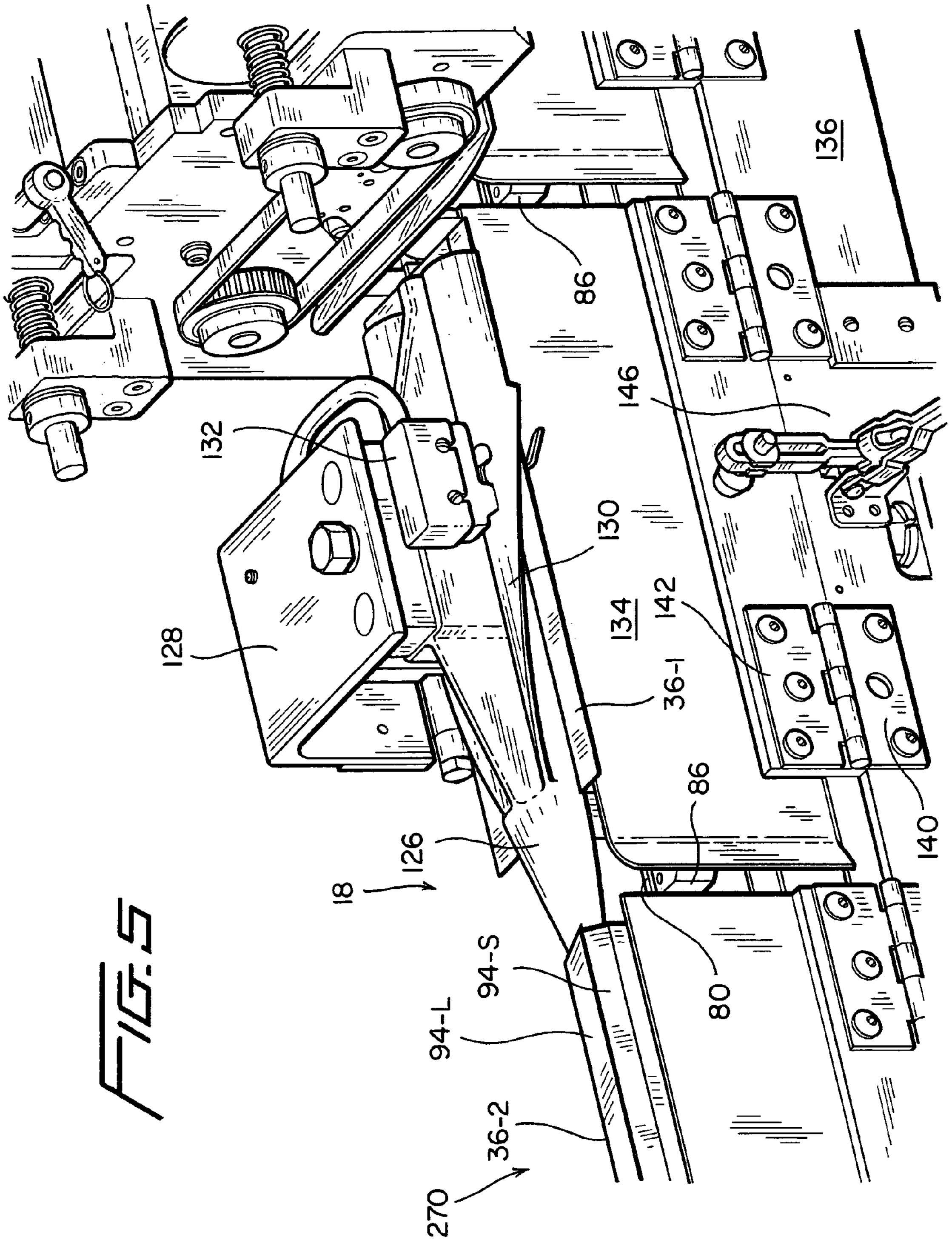
FIG. 5 is a perspective view of the cigarette carton plow station, of the processing or operational line of the new and improved synchronized stamp applicator machine, apparatus, or system of the present invention as disclosed within FIG. 1, at which the top flap members of the cigarette carton, previously initially opened or separated at the top flap opening station as disclosed within

It is to be noted that activation of the vacuum or suction operatively associated with the suction cup 112, as well as the source of pressurized air operatively associated with the air nozzle 108, may be achieved by any one of several different means, such as, for example, suitable cam mechanisms disposed upon the accessory drive shaft 82 for directly activating suitable valving mechanisms operatively associated with the air nozzle 108 and the suction cup 112, or alternatively, for causing suitable signals to be transmitted to the program logic controller (PLC) 46 which will, in turn, transmit suitable control signals for controlling the activation of the valving mechanisms. It is to be noted further that upon completion of the adhesive bond severance operation by means of the cutter blade implement 98, activation of the air nozzle 108 and the vacuum through the suction cup 112, as well as the upward pivotal movement of the support arm 114, is terminated whereby the unsealed top flap members 94-L,94-S of the cigarette carton 36 will inherently remain in their partially OPENED state, due to the fact that they are no longer bonded together, in preparation for movement to their fully OPENED state at the next cigarette carton top flap opening station 18. After the cigarette carton 36 disposed at the cigarette carton top flap member unsealing station 16 has had its top flap members 94-L,94-S unsealed and partially opened by means of the cutter blade implement 98, the cigarette carton 36 is therefore conveyed from the cigarette carton top flap member unsealing station 16 to the cigarette carton top flap opening station 18 at which the top flap members 94-L,94-S of the cigarette carton 36 will be moved to their fully OPENED positions with respect to each other so as to effectively uncover and expose the cigarette packages contained within the cigarette carton 36 whereby each cigarette package can then have a stamp applied thereto at the next cigarette package stamp applicator station 20. With reference therefore being made to FIGS. 1 and 5, the primary operative component which is disposed at the cigarette carton top flap opening station 18 comprises a plow member 126 which is fixedly mounted upon a suitable mounting bracket 128 and which, as is clearly illustrated within FIG. 5,.is adapted to effectively be inserted beneath the partially OPENED, overlapped top flap members 94L,94-S.

It can be further appreciated from FIGS. 4 and 5 that, in conjunction with the cyclic longitudinal conveyance or transfer operation serially performed or conducted with respect to the plurality of cigarette cartons 36 at the various operational or processing stations, as the second cigarette carton 36-2 is moved to and disposed at the cigarette carton top flap member unsealing,station 16, the first cigarette carton 36-1 has been moved to and is disposed, in effect, at the entrance to the cigarette carton top flap opening station 18 whereby the forward or upstream end tapered tip portion of the plow member 126 has just been inserted into the interstice or space defined beneath the partially OPENED, overlapped top flap members 94-L,94-S. As can additionally best be seen from FIG. 5, the rearward or downstream end portion of the plow member 126 has integrally connected thereto, and upon opposite lateral sides thereof, a pair of outwardly projecting or extending flared wing members 130, only one of which is actually visible. Accordingly, during the next cyclic portion or phase of the cigarette carton conveyance, transfer, or transportation operation, as the cigarette carton 36 is moved downstream relative to the plow member 126, the plow member 126 and the outwardly flared downstream portions or members 130 thereof will cause the cigarette carton top flap members 94-L, 94-S to be effectively moved from their overlapped, partially OPENED positions with respect to each other to fully OPENED positions with respect to each other so as to uncover and expose the cigarette packages contained within the cigarette carton 36 in preparation for stamps to be applied to the cigarette packages contained within the cigarette carton 36 when the cigarette carton 36 is moved to the cigarette package stamp applicator station 20.

As a failsafe mechanism for effectively ensuring the fact that the top flap members 94-L,94-S have been moved from their overlapped, partially OPENED positions to their fully OPENED positions, at which, for example, the top flap members 94-L,94-S extend in opposite directions with respect to each other and have an included angle of 180° defined therebetween, a feeler switch mechanism 132 is also fixedly mounted upon one side of the mounting bracket 128. Accordingly, if the top flap members 94-L,94-S of the cigarette carton 36 have in fact been moved to their fully OPENED positions with respect to each other, the smaller one of the top flap members 94-S will operatively engage the switch mechanism 132 whereby the latter will transmit a first signal to the program logic controller (PLC) 46 indicating the fact that the top flap members 94-L,94-S are in fact been properly disposed at their fully OPENED positions so as to expose the cigarette packages contained within the cigarette carton 36 in preparation for stamps to be applied to the cigarette packages at the next cigarette package stamp applicator station 20. Conversely, if for some reason the top flap members 94-L, 94-S of the cigarette carton 36 have not in fact been properly moved from their overlapped partially OPENED positions to their fully OPENED positions, such as, for example, if the plow member 126 was not in fact properly inserted or disposed within the interstice or space defined beneath the overlapped partially OPENED top flap members 94-L,94-S, then the smaller top flap member 94-S will not operatively engage the feeler switch mechanism 132 whereby the feeler switch mechanism 132 will transmit a second signal to the program logic controller (PLC) 46 whereby the same will terminate further processing and movement of the cigarette cartons 36 so as to permit operator personnel to remove the improperly processed cigarette carton 36 from the processing line.

It is noted at this junction, and in conjunction with the foregoing, that in order to permit operator personnel to readily have access to any one of the cigarette cartons 36 which may be disposed at any one of the operational or processing stations 15–22 disposed along the operational or processing line when, for example, one of the cigarette cartons 36 has not been properly processed, or similarly, when one of the cigarette cartons 36 has in effect become jammed at a particular location along the operational or processing line, unique and novel access means have been provided at substantially each one of the operational or processing stations 15–22 of the operational or processing line. More particularly, as can be best seen in FIGS. 1 and 4–7, a plurality of access door members 134 are pivotally mounted upon a single elongated fixed wall member 136 which extends longitudinally along substantially the entire operational or processing line of the machine or system 10. Suitable hinge mechanisms 138 comprise first and second hinge plate members 140,142 wherein the lower hinge plate member 140 is fixedly mounted upon the fixed wall member 136 while the upper hinge plate member 142 is fixedly mounted upon the forward surface of a mounting plate 144 while the lower edge portion of each door member 134 is fixedly mounted upon a rear surface portion of the mounting plate 144.

Over-center locking mechanisms 146 have a mounting bracket member 148 fixedly mounted upon the elongated wall member 136, while a stopper member 150 is pivotally mounted upon the mounting bracket member 148, a manually-operated lever mechanism 152 being operatively connected to the stopper member 150 in a well-known manner for moving the stopper member 150 to the fixed or LOCKED position at which the door member 134 is disposed in the illustrated upright position, and a RELEASED position at which the door member 134 is able to be pivotally moved to a lowered position at which access to the cigarette carton 36 is readily permitted. It is noted that such pivotally mounted access doors 134 are not provided at either one of the cigarette carton loading or cigarette carton unsealing stations 15,16 because sufficient access is already effectively provided for the operator personnel at such cigarette carton loading and cigarette carton unsealing stations 15,16 from positions above each one of such cigarette carton loading and cigarette carton unsealing stations 15,16. In particular, the cigarette cartons 36 can effectively be removed or extracted from such cigarette carton loading and cigarette carton unsealing stations 15,16 simply by lifting the same vertically upwardly with respect to the various operational or processing implements disposed at the cigarette carton loading and cigarette carton unsealing stations 15,16.

With reference now being specifically made to FIG. 6, the details of the cigarette package tax stamp applicator station 20 will be described. More particularly, a stamping iron in the form of an iron block 154 is used to apply tax stamps onto the upper surface portions of each one of the individual cigarette packages disposed within the cigarette cartons 36, and it is seen that the bottom or lower surface of the stamping iron 154 is provided with a plurality of longitudinally spaced stamping iron shoes 156,158,160, 162,164. The tax stamps are provided as waxed impressions upon a supply roll of paper, and the opposite ends of the paper roll are interposed between a pair of disks 166,168 which form a paper holder assembly. The waxed tax stamps are effectively transferred from the roll of paper onto the upper surface portions of the individual cigarette packages contained within each cigarette carton 36 when the stamping iron shoes 156,158,160,162,164 come into contact with the waxed tax stamps and are appropriately energized so as to effectively melt the waxed tax stamps. The disk 166 is mounted upon a spindle 170 which is rotatably mounted in a spring-biased manner within a bearing block assembly 172 so as to permit the supply roll of waxed tax stamp paper to be inserted between the disks 166,168 when the disk 166 is effectively moved axially away from or relative to the disk 168 against the spring bias, and disk 168 is mounted upon a spindle 174 which is rotatably mounted within another bearing block assembly 176. The bearing block assemblies 172,176 are fixedly mounted upon external surface portions of oppositely disposed end walls 178,180 of a housing or platform assembly 182, and a pair of indexably driven rollers 183, 184, as well as a pair of guide rollers 186,188 have their opposite ends rotatably mounted within the end walls 178,180 so as to extend therebetween.

A servo drive motor assembly 190 is mounted upon the front wall 192 of the housing or platform assembly 182 by means of a suitable mounting block assembly 194, and it is seen that the servo drive motor assembly 190 has a drive shaft 196 projecting outwardly therefrom. The free or distal end portion of the servo motor drive shaft 196 has a drive pulley 198 mounted thereon, and a first end of the indexably driven roller 183 has a driven pulley 200 mounted thereon, wherein a pulley belt 202 drivably interconnects the drive and driven pulleys 198,200. The opposite end of the indexably driven roller 183 is similarly provided with a drive pulley 204 which is rotatably mounted upon the external surface portion of the end wall 178 of the housing or platform assembly 182, and a driven pulley 206, operatively connected to the indexably driven roller 184, is likewise rotatably mounted upon the external surface portion of the end wall 178, wherein a pulley belt 208 drivably interconnects the drive and driven pulleys 204,206. Accordingly, when the accessory shaft 82 is rotatably driven through one cyclic revolution, a suitable cam member assembly or the like disposed upon the accessory shaft 82 will cause a signal to be transmitted to the program logic controller (PLC) 46 whereby the program logic controller (PLC) 46 will initiate the tax stamp application operation or process which includes the transmission of a suitable signal to the servo drive motor 190. The driven rollers 183,184 have a plurality of drive pins, not shown, fixedly mounted upon their opposite ends for drivingly engaging apertures provided within the opposite ends of the waxed tax stamp paper disposed upon the supply roll of waxed tax stamp paper rotatably supported upon the spindled disks 166,168, and in this manner, when the servo drive motor 190 is indexably activated by means of the program logic controller (PLC) 46, the driven rollers 183,184 will be accordingly indexably driven so as to efectively indexably advance the supply roll of waxed tax stamp paper whereby new or fresh tax stamp impressions disosed upon the waxed tax stamp paper are serially presented to the stamping iron shoes 156,158,160, 162,164.

It is to be noted that the tax stamps are effectively preprinted or pre-formed upon the supply roll of waxed tax stamp paper within longitudinally extending rows comprising fifteen tax stamps per row, or in other words, each tax stamp is disposed within a row of tax stamps defining fifteen tax stamp positions. Conventionally, the cigarette cartons 36 are packaged in such a manner that the cigarette packages, disposed inside each one of the cigarette cartons 36, are arranged within an array comprising two rows of cigarette packages, with each row of cigarette packages comprising five cigarette packages. In other words, the cigarette packages are disposed within an array comprising two rows and five columns. Accordingly, the stamping iron 154 is provided with the five stamping iron shoes 156,158,160,162, 164 and it is noted that the transverse extent of each one of the stamping iron shoes 156,158,160,162,164 is large enough so as to effectively cover or thermally interact with waxed tax stamps disposed within two adjacent rows of stamps so as to, in turn, apply the stamps to both of the cigarette packages disposed within each one of the five columns of cigarette packages disposed within each one of the cigarette cartons 36. It is further noted that the stamping iron shoes 156,158,160,162,164 are longitudinally spaced from each other, as is clearly seen from FIG. 6, such that when the stamping iron 154 is disposed at a predetermined position at or relative to the cigarette package tax stamp applicator station 20, each one of the stamping iron shoes 156,158,160, 162,164 will respectively thermally engage or interact with every third tax stamp pre-formed or pre-printed upon the waxed tax stamp paper.

More particularly, in accordance with the structural system characterizing the cigarette package tax stamp applicator station 20 as constructed or developed in accordance with the principles and teachings of the present invention, the stamping iron 154 is adapted to be linearly moved in a longitudinally oriented mode and in precisely defined incremental steps in both the upstream or downstream directions, as denoted by means of the arrows U and D, by means of, for example, a suitable servo motor drive assembly 210, which actually comprises a pair of double-acting servo motor drives 212,214, is operatively connected to the program logic controller (PLC) 46. The servo motor drive 214 is operatively mounted upon a suitable mounting bracket 216 which, in turn, is affixed to an upstanding portion of the rear wall 218 of the housing or platform assembly 182, while the servo motor drive 212 is operatively connected to an upstanding mounting plate portion 220 of a slide block 222. The rear side of the slide block 222 is slidably movable upon a slide rail 224 which is also fixedly mounted upon the rear wall 218 of the housing or platform assembly 182, and a pneumatic control assembly 226 is fixedly mounted upon the front side of the slide block 222. The pneumatic control assembly 226 comprises a piston-cylinder mechanism 228 wherein the lower end of the piston member of the piston-cylinder mechanism 228 is operatively connected to a mounting block 230 which is fixedly mounted atop the stamping iron 154, and the mounting block 230 also has a pair of guide rods 232,232 fixedly mounted thereon and passing upwardly through the pneumatic control assembly 226 for guiding the vertical movements of the stamping iron 154 in a stabilized manner under the control of the piston-cylinder mechanism 228.

It can therefore be appreciated, in accordance with the foregoing, that when the stamping iron 154 is disposed at the first downstream position under the control of the servo motor drives 212,214 in accordance with suitable control signals received from the program logic controller (PLC) 46, and when the stamping iron 154 is likewise disposed at its proper elevational level for engaging the cigarette packages disposed within a particular one of the cigarette cartons 36 under the control of the piston-cylinder mechanism 228 of the pneumatic control assembly 226 in accordance with a suitable control signal received from the program logic controller (PLC) 46, the stamping iron shoes 156,158,160,162,164 will be positioned so as to thermally engage and interact with those tax stamps, disposed upon the waxed tax stamp paper, which are located at positions 1,4, 7,10, and 13 of the aforenoted fifteen tax stamp positions. Similarly, when the stamping iron 154 is disposed at the second or intermediate position, the stamping iron shoes 156,158,160,162,164 will be located or positioned so as to thermally engage and interact with those tax stamps, disposed upon the waxed tax stamp paper, which are located at positions 2,5,8,11, and 14 of the aforenoted fifteen tax stamp positions, and lastly, when the stamping iron 154 is disposed at the third or upstream location or position, the stamping iron shoes 156,158,160,162,164 will be positioned so as to thermally engage and interact with those tax stamps, disposed upon the waxed tax stamp paper, which are located at positions 3,6,9,12, and 15 of the aforenoted fifteen tax stamp positions.

It can therefore be further appreciated that when all of the waxed tax stamps originally located at all of the fifteen tax stamp positions have been transferred to cigarette packages contained within the cigarette cartons 36, the servo drive motor 190 will be accordingly activated by means of the program logic controller (PLC) 46 so as to effectively index the supply roll of waxed tax stamp paper whereby a new or fresh supply of waxed tax stamps will be properly positioned with respect to the stamping iron 154 such that new waxed tax stamps can be transferred to new or additional cigarette packages disposed within an upstream cigarette carton 36 which is presented to the cigarette package tax stamp applicator station 20. In accordance with such indexed movement or drive of the supply roll of waxed tax stamp paper, it is additionally noted that the cigarette package tax stamp applicator station 20 is also provided with a take-up roll assembly by means of which used or depleted waxed tax stamp paper is collected.

Figure 6:
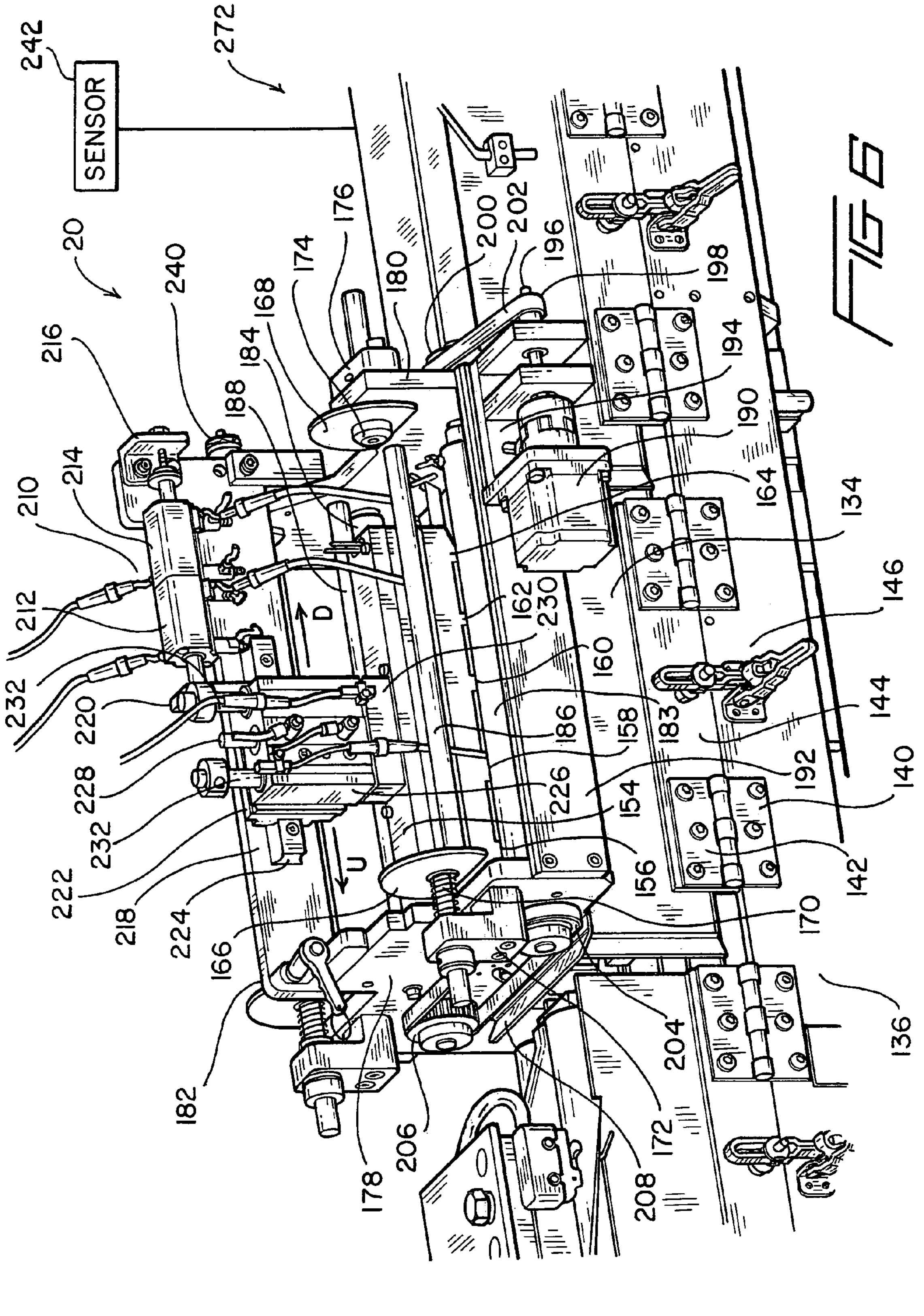
FIG. 6 is a perspective view of the stamp application station, of the processing or operational line of the new and improved synchronized stamp applicator machine, apparatus, or system of the present invention as disclosed within FIG. 1, at which stamps are applied to each one of the individual cigarette packages disposed within each one of the cigarette cartons.

In particular, as can best be appreciated from reference being additionally made to FIG. 6, the take-up roll assembly is partially disclosed as comprising a disk 234, a rotatable spindle 236, and a bearing assembly 238, all of which are structurally similar to the supply roll disk 166, spindle 170, and bearing assembly 172. The opposite end of the take-up roll assembly also comprises a disk, not shown, which is similar to that of supply roll disk 168, however, it is additionally noted that such disk, not shown, is operatively connected to suitable gearing 240 which is adapted to be operatively connected to the pulley-driven roller 184 whereby the take-up roll assembly is effectively operatively connected to, and driven by, the servo drive motor 190. Accordingly, as the waxed tax stamp paper is unreeled from the supply roll of waxed tax stamp paper mounted upon disks 166,168, routed around guide roller 186, engaged by the drive pins of driven roller 183, passed beneath the stamping iron 154, engaged by the drive pins of driven roller 184, and routed around guide roller 188, it can be reeled upon the take-up roll, as a result of the positive drive imparted thereto, such that the used waxed tax stamp paper can be collected and ultimately replaced when, for example, the supply of the waxed tax stamps, originally disposed upon the supply roll of waxed tax stamp paper, has been depleted as a result of all of the waxed tax stamps having been transferred and applied to cigarette packages contained within the cigarette cartons 36.

Figure 7:
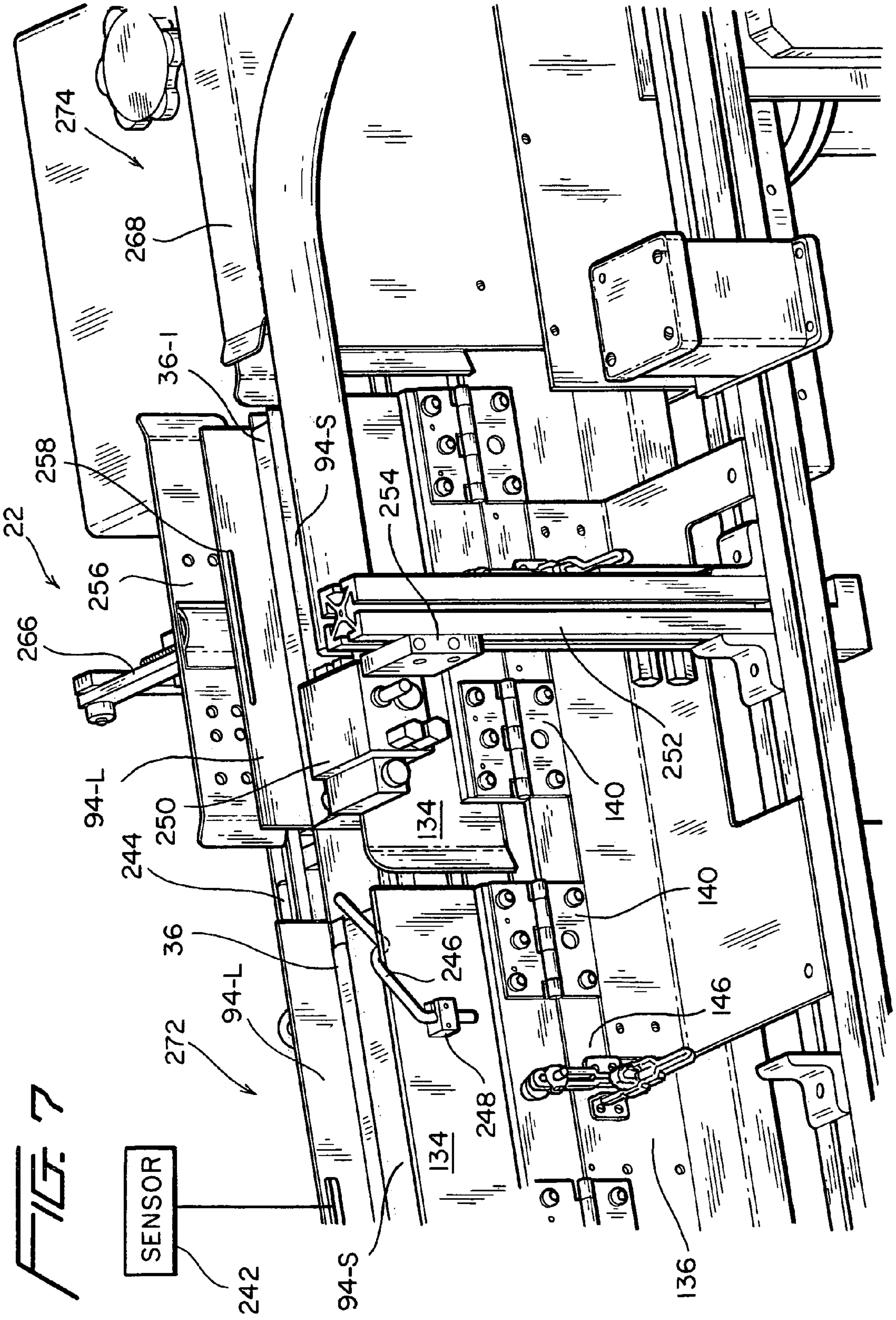
FIG. 7 is a perspective view of the cigarette carton resealing station, of the processing or operational line of the new and improved synchronized stamp applicator machine, apparatus, or system of the present invention as disclosed within FIG. 1, at which each one of the cigarette cartons, having had the stamps applied to each one of the individual cigarette packages contained therein, now has adhesive applied to an underside portion of the larger top flap member thereof, the top flap members are subsequently folded with respect to each other in an overlapped manner, and the adhesively bonded top flap members are maintained or held in their overlapped position so as to permit the adhesive to cure and set.

With reference lastly being made to FIG. 7, the various operative components of the cigarette carton top flap closing and re-sealing station 22 will now be described in detail. Disposed immediately downstream of the cigarette package tax stamp applicator station 20, and therefore effectively disposed at the upstream entrance end of the cigarette carton top flap closing and re-sealing station 22, there is provided a suitable sensor 242 which detects the presence of a cigarette carton 36 and thereby confirms the fact that the particular cigarette carton 36 has exited the cigarette package tax stamp applicator station 20 and is proceeding downstream toward the cigarette carton top flap closing and re-sealing station 22.

While not shown, sensors similar to sensor 242 can likewise be appropriately positioned with respect to the other operational or processing stations for similarly detecting and confirming the fact that a cigarette carton 36 has exited the previous operational or processing station. In this manner, the particular components disposed at a particular one of the operational or processing stations are not needlessly activated if in fact a cigarette carton 36 is not present to be acted upon. Such a scenario can entail, for example, the instance wherein some malfunction or jam occurred along the processing line requiring a particular one of the cigarette cartons 36 to have been previously removed. In connection with the cigarette carton top flap closing and re-sealing station 22, the disposition of the sensor 242 is particularly important because if a cigarette carton 36 was not in fact disposed at the cigarette carton top flap closing and re-sealing station 22, then when the adhesive material, for re-sealing the top flap members 94-L,94-S of the cigarette carton 36, was dispensed, the adhesive material would not in fact be deposited upon the underside surface portion of the larger top flap member 94-L of the cigarette carton 36, whereby the adhesive material would foul some of the other operative components disposed at the cigarette carton top flap closing and resealing station 22.

Having passed the sensor 242 and having therefore been appropriately detected, the cigarette carton 36 is conveyed downstream by means of the transfer mechanism toward the cigarette carton top flap closing and re-sealing station 22. It is to be remembered that since the cigarette carton 36 was just processed within the cigarette package tax stamp applicator station 20 wherein the top flap members 94-L,94-S thereof were disposed at their fully OPENED positions at which the top flap members 94-L,94-S extended outwardly away from each other in opposite directions, it is now necessary to fold the top flap members 94-L,94-S inwardly toward each other in preparation for the cigarette carton 36 to be closed and re-sealed. Accordingly, the upstream end portion of the cigarette carton top flap closing and re-sealing station 22 is provided, upon the rear side thereof, with a first camming rod member 244, only partially visible in FIG. 7, which is adapted to operatively engage the larger top flap member 94-L of the cigarette carton 36 and thereby cause the same to achieve a substantially vertically upright disposition or orientation. In a similar manner, a second camming rod member 246 is fixedly mounted, by means of a suitable mounting bracket 248, upon one of the pivotal access doors 134 so as to operatively engage the smaller top flap member 94-S of the cigarette carton 36 and thereby cause the same to achieve a substantially horizontal disposition or orientation covering the stamped cigarette packages disposed within the cigarette carton 36.

Once the larger and smaller top flap members 94-L, 94-S of the cigarette carton 36 have been disposed in their proper dispositions or orientations, the cigarette carton 36 is now ready to have adhesive applied to the undersurface portion of the larger top flap member 94-L so as to achieve re-sealing of the cigarette carton 36. Accordingly, the cigarette carton top flap closing and re-sealing station 22 further comprises an adhesive or glue gun assembly 250 which is fixedly mounted upon an upstanding standard 252 by means of a suitable mounting bracket 254, and a backup plate 256 against which the larger top flap member 94-L of the cigarette carton 36 is supported during the application of the adhesive material or glue in the form of an adhesive or glue strip 258 onto the undersurface portion of the larger top flap member 94-L by means of the adhesive or glue gun 250. Operation of the adhesive or glue gun assembly 250 is timely controlled by means of the program logic controller (PLC) 46 as a result of a signal transmitted thereto by means of the sensor 242, and as best seen in FIG. 1, the machine, apparatus, or system 10 of the present invention further comprises an adhesive supply tank 260 and an adhesive supply pump 262 by means of which adhesive material or glue is supplied to the adhesive or glue gun assembly 250 through a suitable conduit 264. Still further, a crank arm mechanism 266 is operatively connected through means of a suitable pivotal connection to the back side of the backup plate 256 as can be seen in FIG. 7, and the crank arm mechanism 266 is adapted to be actuated by means of, for example, a suitable cam mechanism, not shown, disposed upon the accessory shaft 82. Alternatively, the crank arm mechanism 266 may be driven by means of a suitable actuator, not shown, which may be activated by a suitable control signal issued from the program logic controller (PLC) 46.

In either case, the controlled actuation of the crank arm mechanism 266 from the position illustrated in FIG. 7 to its alternative stroke position causes the backup plate 256 to be pivoted downwardly or through an arcuate extent of 90° whereby the backup plate 256 forces the larger top flap member 94-L of the cigarette carton 36 into contact with the previously folded smaller top flap member 94-S of the cigarette carton 36 so as to permit the adhesive material 258, already deposited upon the undersurface portion of the larger top flap member 94-L of the cigarette carton 36 by means of the adhesive or glue gun assembly 250, to adhere to the folded smaller top flap member 94-S thereby achieving complete closure and re-sealing of the cigarette carton 36. The particular adhesive material or glue utilized to re-seal each cigarette carton 36 is relatively fast drying, that is, the adhesive material or glue will dry within a period of 0.5–1.0 seconds, however, to ensure the fact that the adhesive material or glue has sufficient time to properly cure and set, the cigarette carton top flap closing and re-sealing station 22 further comprises a seal maintenance box 268 through which the re-sealed cigarette carton 36 is passed during the next cyclic portion of the entire tax stamp application operation performed in connection with each cigarette carton 36.

The seal maintenance box 268 comprises a substantially hollow container which is open at both opposite ends and which has a substantially rectangular parallelepiped configuration. The upper interior wall surface of the box or container 268 is provided with a leaf spring member, not shown but similar to the leaf spring member 90 disposed at the cigarette carton top flap member unsealing station 16, for engaging the external surface portion of the folded larger top flap member 94-L of the cigarette carton 36 so as to maintain the larger top flap member 94-L adhesively bonded to the smaller top flap member 94-S as the cigarette carton 36 is conveyed through the seal maintenance box or container 268. It is noted that the rear wall, not shown, of the seal maintenance box or container 268 is provided with a suitable slot, or the like, also not shown, for accommodating the pusher or conveyor implements 86 of the chain drive transfer mechanism 80. Once the re-sealed cigarette carton 36 exits the seal maintenance box or container 268, the cigarette carton 36 may then be further conveyed or transferred to another processing station, not shown, for final distribution and transportation.

While the basic overall operation of the new and improved synchronized stamp applicator machine, apparatus, or system 10, constructed in accordance with the principles and teachings of the present invention, is believed to be substantially apparent from the foregoing detailed description, a brief discussion of the operation of the new and improved synchronized stamp applicator machine, apparatus, or system 10 of the present invention is believed to be warranted in order to further emphasize some additional unique and novel operational features of the machine, apparatus, or system 10 of the present invention which may not have become apparent from the foregoing detailed description. For example, while the foregoing detailed description has specifically identified and referred to five operational or processing stations 15,16,18, 20,22 longitudinally spaced along the processing line of the machine, apparatus, or system 10, in reality there are actually eight positions at which each one of the cigarette cartons 36 is stopped during each operative cycle of the overall cigarette carton unsealing, cigarette carton opening, cigarette package stamping, cigarette carton closing, and cigarette carton re-sealing operation. It is also to be emphasized that the entire cigarette carton unsealing, cigarette carton opening, cigarette package stamping, cigarette carton closing, and cigarette carton re-sealing operation is entirely synchronized in that when a particular operation or procedure is being performed upon a particular cigarette carton 36, another particular operation or procedure is being performed upon another cigarette carton 36 at precisely the same time.

Accordingly, a brief description of the operation of the new and improved machine, apparatus, or system 10 of the present invention will now be provided in connection with the processing of eight cigarette cartons 36-1 through 36-8 as disclosed within FIG. 2. As has been previously noted, after the first cigarette carton 36-1 has had its height dimension determined at the cigarette carton sensing and height determination station 14 whereupon the gate members 38,38 are then moved to their OPENED positions so as to permit all of the cigarette cartons 36 to be conveyed toward the cigarette carton loading station 15, the height dimension data of the first cigarette carton 36-1 is transmitted to the program logic controller (PLC) 46 whereby the same controls the elevational disposition of the rail member 62 through means of the servo drive motor and the linear actuator mechanism 76,74. The first cigarette carton 36-1 will now also be disposed at the cigarette carton loading station 15, and when the presence of the first cigarette carton 36-1 has been detected at the cigarette carton loading station 15 by means of the cigarette carton sensor, which is integrally incorporated within the upper surface portion of the rail member 62 at the cigarette carton loading station 15, the transfer mechanism and accessory shaft drive motor 78 is energized. Accordingly, the first cigarette carton 36-1 will now be moved by means of one of the pusher implements 86 of the chain drive transfer mechanism 80 from the cigarette carton loading station 15 to the cigarette carton top flap member unsealing station 16 at which the movement of the chain drive transfer mechanism 80 will be temporarily terminated in order to permit the air nozzle 108, the suction cup 112, and the cutter blade implement 98 to operatively cooperate together in order to sever the original adhesive bond defined between the top flap members 94-L, 94-S of the cigarette carton 36-1 whereby the top flap members 94-L,94-S of the cigarette carton 36-1 will now be disposed in their partially opened positions. At the same time that the first cigarette carton 36-1 has been moved by the transfer mechanism 80 to the cigarette carton top flap member unsealing station 16, the second cigarette carton 36-2 has also been moved by means of the conveyor belts 24,24 to the cigarette carton loading station 15.

It is to be noted that the chain drive transfer mechanism 80 and the accessory shaft 82 are constantly driven by means of the drive motor 78 and transmission 84, however, the various operative implements disposed at each operational or processing station 16–22 is in effect intermittently driven or actuated by suitable cam means, switches, sensors, or the like, operatively associated with the accessory drive shaft 82. In addition, and in a similar manner, the chain drive transfer mechanism 80 has a suitable variable speed drive mechanism operatively connected thereto or associated therewith such that the transfer mechanism 80, and therefore each cigarette carton 36, can intermittently or periodically undergo a cigarette carton movement or transfer cycle, by means of which the cigarette cartons 36 are transferred or conveyed from one cyclic position, or operational or processing station, to another cyclic position, or operational or processing station, which comprises an initial acceleration from its stopped state, a brief operation at a constant velocity, and final deceleration to its stopped state. Such a variable drive mechanism may comprise any conventional drive mechanism, such as, for example, a Geneva drive system, or the like.

Continuing further, after the adhesive bond upon the first cigarette carton 36-1 has been severed at the cigarette carton top flap member unsealing station 16, the first cigarette carton 36-1 is moved to and stopped at what may be termed a plow engagement position 270 as illustrated in FIG. 4, while the second cigarette carton 36-2 is now disposed at the cigarette carton top flap member unsealing station 16, and the third cigarette carton 36-3 is disposed at the cigarette carton loading station 15. It is to be appreciated that in accordance with the operational techniques characteristic of the present invention, since each cigarette carton 36 will undergo deceleration upon being stopped at a particular position, or operational or processing station, then the slowing or deceleration of, for example, the first cigarette carton 36-1 at the plow engagement position 270 permits or facilitates the proper engagement of the tapered front tip portion of the plow member 126 with the first cigarette carton 36-1 so as to effectively ensure the disposition of the tapered front tip portion of the plow member 126 into the interstice or space defined between the partially opened top flap members 94-L,94-S of the cigarette carton 36-1 whereby the subsequent opening of the top flap members 94-L,94-S to their fully opened positions with respect to each other can be properly achieved. Such full opening of the top flap members 94-L,94-S of the first cigarette carton 36-1 is of course achieved by means of the plow member 126 and the outwardly flared members 130 as the first cigarette carton 36-1 is moved through the cigarette carton top flap opening station 18 during the next operational cycle as has been illustrated in FIG. 5. As has been noted in conjunction with the disposition of the first cigarette carton 36-1 at the plow engagement position 270, and the movement of the cigarette carton 36-1 through the acceleration, constant velocity, and deceleration phases, it is to be appreciated that as the first cigarette carton 36-1 is moved from the plow engagement position 270 and through the cigarette carton top flap opening station 18 to the final stopped position as illustrated in FIG. 5, the initial acceleration of the cigarette carton 36-1, with respect to the plow member 126 which is already operatively engaged with the top flap members 94-L,94-S, will facilitate the relatively rapid opening of the top flap members 94-L,94-S of the cigarette carton 36-1. At this point in time, it is of course to be further appreciated that the second cigarette carton 36-2 is now disposed at the plow engagement position 270, the third cigarette carton 36-3 is disposed at the cigarette carton top flap member unsealing station 16, and the fourth cigarette carton 36-4 is disposed at the cigarette carton loading station 15.

After the first cigarette carton 36-1 has had its top flap members 94-L,94-S moved to their fully opened positions with respect to each other, the first cigarette carton 36-1 is moved to the cigarette package stamp applicator station 20 so as to have the tax stamps applied to the individual cigarette packages contained within the first cigarette carton 36-1, the second cigarette carton 36-2 is simultaneously moved through the cigarette carton top flap opening station 18, the third cigarette carton 36-3 is now disposed at the plow engagement position 270, the fourth cigarette carton 36-4 is disposed at the cigarette carton top flap member unsealing station 16, and the fifth cigarette carton 36-5 is disposed at the cigarette carton loading station 15. Subsequently, upon completion of the application of the tax stamps to the individual cigarette packages contained within the first cigarette carton 36-1, the first cigarette carton 36-1 is conveyed, during the next cyclic movement of the transfer mechanism 80, to and stopped at what may be termed a cigarette carton sensing and top flap orientation position 272 as illustrated in FIGS. 6 and 7. This is the position at which the sensor 242 detects and confirms the presence of the cigarette carton 36-1 as the same has exited from the cigarette package stamp applicator station 20 so as to subsequently permit activation of the adhesive material or glue gun assembly 258.

In addition, it is noted that the smaller top flap member 94-S has been folded over the cigarette packages contained within the cigarette carton 36-1, and that the larger top flap member 94-L is disposed in a vertically upright orientation, or in other words is disposed at an angle of 90° with respect to the folded smaller top flap member 94-S. This is important because when the first cigarette carton 36-1 is subsequently conveyed through the cigarette carton top flap closing and re-sealing station 22, the larger top flap member 94-L need only be moved 90° from its adhesive application position to its folded and sealed position with respect to the previously folded smaller top flap member 94-S as opposed to having to be moved through an angular extent of 180° as is conventionally required. It is of course to be noted further that while the first cigarette carton 36-1 is disposed at the cigarette carton sensing position 272, the second cigarette carton 36-2 is disposed at the cigarette package stamp applicator station 20, the third cigarette carton 36-3 has been simultaneously moved through the cigarette carton top flap opening station 18, the fourth cigarette carton 36-4 is now disposed at the plow engagement position 270, the fifth cigarette carton 36-5 is disposed at the cigarette carton top flap member unsealing station 16, and the sixth cigarette carton 36-6 is disposed at the cigarette carton loading station 15.

Continuing still further, during the next cyclic movement of the cigarette cartons 36 through the operational or processing line of the machine, apparatus, or system 10 of the present invention, the first cigarette carton 36-1 will be moved through the cigarette carton top flap closing and re-sealing station 22. It is to be particularly noted, appreciated, and understood that, in accordance with the unique and novel principles and teachings of the present invention, as the first cigarette carton 36-1 is moved through the cigarette carton top flap closing and re-sealing station 22, as illustrated within FIG. 7, that is, during such a single operative cycle of the machine, apparatus, or system of the present invention, the larger top flap member 94-L is properly positioned at its 90° orientation in order to receive the application of the adhesive material or glue to the undersurface or interior surface portion thereof, the adhesive material or glue is in fact applied to the undersurface or interior surface portion of the larger top flap member 94-L of the cigarette carton 36-1, and the larger top flap member 94-L of the cigarette carton 36-1 is folded over onto the upper external surface portion of the previously folded smaller top flap member 94-S. This series of operations or procedures within a single operational cycle is critically important and represents a significant departure from conventional operational or processing techniques performed within conventional tax stamp applicator machines, apparatus, or systems.

More particularly, in view of the fact that, if some malfunction occurs within the machine, apparatus, or system 10 of the present invention, which would otherwise prevent, for example, the cigarette cartons 36 from being further moved from one operational or processing station to another operational or processing station, then in accordance with the operational or processing techniques characteristic of the machine, apparatus, or system 10 of the present invention, the cigarette cartons 36 will nevertheless have had the adhesive or glue material 258 applied thereto, and the cigarette cartons 36 will also be able to be closed and sealed. Conventionally, this series of operations or procedures have not been completed within a single cycle whereby if the cigarette cartons 36 were not able to be moved from one operational or processing station due to a systemic malfunction, then cigarette cartons might be present with adhesive applied thereto, however, the cigarette cartons will not have been closed and sealed whereby the adhesive material or glue will cure, dry, and set thereby fouling the same in connection with subsequent processing. It is of course also to be noted that while the first cigarette carton 36-1 is having the adhesive material or glue applied to its larger top flap member 94-L, and being subsequently closed and sealed, at the cigarette carton top flap closing and re-sealing station 22, the second cigarette carton 36-2 is disposed at the cigarette carton sensing position 272, the third cigarette carton 36-3 is disposed at the cigarette package stamp applicator station 20, the fourth cigarette carton 36-4 has been simultaneously moved through the cigarette carton top flap opening station 18, the fifth cigarette carton 36-5 is now disposed at the plow engagement position 270, the sixth cigarette carton 36-6 is disposed at the cigarette carton top flap member unsealing station 16, and the seventh cigarette carton 36-7 is disposed at the cigarette carton loading station 15.

Lastly, after the first cigarette carton 36-1 has had the adhesive material or glue 258 applied to the undersurrface portion of the larger top flap member 94-L, and after the larger top flap member 94-L has been closed to its overlapped position with respect to the smaller top flap member 94-S, the first cigarette carton 36-1 is cyclically moved downstream to and stopped at what may be termed a resealed cigarette carton curing position 274 which is also illustrated within FIG. 7. At this position, as has been noted hereinbefore, the re-sealed cigarette carton 36-1 is maintained in its closed position by means of the tubular seal maintenance box or container 268 so as to ensure the fact that the adhesive material or glue 258 properly cures and sets whereby the cigarette carton 36-1 will in fact be closed and re-sealed. At this point in time, it is of course also noted that the second cigarette carton 36-2 will be disposed at the cigarette carton top flap closing and resealing station 22, the third cigarette carton 36-3 will be disposed at the cigarette carton sensing position 272, the fourth cigarette carton 36-4 will be disposed at the cigarette package stamp applicator station 20, the fifth cigarette carton 36-5 has been simultaneously moved through the cigarette carton top flap opening station 18, the sixth cigarette carton 36-6 is now disposed at the plow engagement position 270, the seventh cigarette carton 36-7 is disposed at the cigarette carton top flap member unsealing station 16, and the eighth cigarette carton 36-8 is disposed at the cigarette carton loading station 15.

At this point in time, the processing of the first cigarette carton 36-1 is entirely complete, and accordingly, during the next cyclic movement of the cigarette cartons 36, the first cigarette carton 36-1 will be discharged from the seal maintenance box or container 268 so as to be processed further, for example, for transportation and distribution, while the second cigarette carton 36-2 will be disposed at the re-sealed cigarette carton curing position 274, the third cigarette carton 36-3 will be disposed at the cigarette carton top flap closing and re-sealing station 22, the fourth cigarette carton 36-4 will be disposed at the cigarette carton sensing position 272, the fifth cigarette carton 36-5 will be disposed at the cigarette package stamp applicator station 20, the sixth cigarette carton 36-6 has been simultaneously moved through the cigarette carton top flap opening station 18, the seventh cigarette carton 36-7 is now disposed at the plow engagement position 270, the eighth cigarette carton 36-8 is disposed at the cigarette carton top flap member unsealing station 16, and the ninth cigarette carton 36-9 is disposed at the cigarette carton loading station 15. This completes the entire operational cycle in connection with the cigarette cartons 36, and accordingly, a new batch of cigarette cartons 36 can be processed. It is to be remembered that as long as any new or successive cigarette cartons 36 have the same height dimension as that of the previously processed or scanned cigarette carton 36, the successive cigarette cartons 36 need not be scanned so as to have their height dimensions determined. If a new batch of cigarette cartons 36 is to be processed, then the delay in loading the new cigarette cartons 36 onto the infeed conveyor table 26 is sufficient for the sensor, disposed at the cigarette carton loading station 15, to detect the absence of a cigarette carton 36 whereby the same terminates operation of the transfer mechanism and accessory shaft drive motor 78 and also sends an appropriate signal to the program logic controller (PLC) 46 for resetting the gate mechanisms 38,38.

Thus, it may be seen that in accordance with the principles and teachings of the present invention, there has been disclosed a machine, apparatus, or system, and a method of operating the same, whereby tax stamps can be automatically applied to individual cigarette packages disposed within cigarette cartons, which may be manufactured by different manufacturers and therefore may have different height dimensions, as a result of the various implements disposed at the cigarette carton unsealing, cigarette carton flap opening, cigarette package tax stamp application, and cigarette carton closing and re-sealing stations being automatically elevationally adjusted by means of a single servo drive motor and linear actuator mechanism. In addition, the adhesive or glue application to the cigarette carton larger top flap member, and the closing of the larger top flap member, is achieved within a single operative cycle, and still further, pivotal access doors are provided at the various operational or processing stations so as to rapidly facilitate the alleviation of any jamming of any one of the cigarette cartons which may occur along the operational or processing line.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. Apparatus for applying tax stamps onto cigarette packages disposed within cigarette cartons which have predeterminedly different height dimensions, comprising:

a plurality of operational stations, longitudinally spaced from each other along a longitudinally extending processing line, respectively comprising a plurality of operational components for respectively performing a plurality of operations upon each one of a plurality of cigarette cartons having the different height dimensions;

means defining a support surface, extending along said longitudinally extending processing line, upon which the plurality of cigarette cartons, having the different height dimensions, are adapted to be movably supported;

conveyor means for serially conveying the plurality of cigarette cartons, having the different height dimensions, along said support surface in an intermittent cyclic manner for permitting each one of the plurality of cigarette cartons, having the different height dimensions, to be periodically stopped at each one of the plurality of operational stations such that each one of said plurality of operational components disposed at each one of said plurality of operational stations can respectively perform its operations upon each one of the plurality of cigarette cartons having the different height dimensions;

a contact member movably disposed at a cigarette carton height determination station for movement into engagement with an upper surface portion of a particular one of the plurality of cigarette cartons, having the different height dimensions, when the particular one of the plurality of cigarette cartons, having the different height dimensions, is disposed at said cigarette carton height determination station;

sensor means, disposed at said cigarette carton height determination station, for sensing the distance of said contact member, disposed in contact with the upper surface portion of the particular one of the plurality of different cigarette cartons, having the different height dimensions, which is disposed at said cigarette carton height determination station, from said sensor means and therefore for determining the particular height dimension of the particular one of the plurality of cigarette cartons, having the different height dimensions, disposed at said cigarette carton height determination station, and for generating data indicative of the particular height dimension of the particular one of the plurality of different cigarette cartons, having the different height dimensions, which is disposed at said cigarette carton height determination station;

single actuator means for adjusting the elevational disposition of said means defining said support surface upon which the plurality of cigarette cartons, having the different height dimensions, are adapted to be movably supported as the plurality of cigarette cartons, having the different height dimensions, are conveyed along said processing line from one of said plurality of operational stations to another one of said plurality of operational stations; and control means for receiving said height dimension data from said sensor means for determining the particular height dimension of the particular one of the plurality of different cigarette cartons, having the different height dimensions, which is disposed at said cigarette carton height determination station, and for controlling said single actuator means so as to adjust the elevational disposition of said means defining said support surface, upon which the plurality of different cigarette cartons, having the different height dimensions, are adapted to be movably supported as the plurality of different cigarette cartons, having the different height dimensions, are conveyed along said processing line from one of said plurality of operational stations to another one of said plurality of operational stations, in accordance with said height dimension data, as determined by said sensor means disposed at said cigarette carton height determination station, characteristic of the particular one of the plurality of different cigarette cartons, having the different height dimensions, disposed at said cigarette carton height determination station, such that the plurality of different cigarette cartons, having the different height dimensions, are always disposed at predeterminedly correct elevational levels with respect to said plurality of operational components respectively disposed at said plurality of operational stations whereby said operational components respectively disposed at said plurality of operational stations can properly perform their operations upon the plurality of different cigarette cartons, having the different height dimensions, regardless of the particular height dimension of the particular one of the plurality of different cigarette cartons having the different height dimensions.

2. The apparatus as set forth in claim 1 wherein:

said single actuator means for adjusting said elevational disposition of said means defining said support surface, upon which the plurality of cigarette cartons are adapted to be movably supported as the plurality of cigarette cartons are conveyed along said processing line from one of said plurality of operational stations to another one of said plurality of operational stations, comprises a single servo mechanism and linear actuator assembly.

3. The apparatus as set forth in claim 1, wherein:

said contact member comprises a horizontally oriented plate which is vertically movable in a reciprocating manner so as to be movable into contact with the upper surface portions of different cigarette cartons having different height dimensions;

said sensor means comprises an ultrasonic sensor for sensing the positional disposition of said horizontally oriented plate;

a second sensor is disposed at said cigarette carton height determination station for detecting the presence of the particular one of the plurality of cigarette cartons at said cigarette carton height determination station; and said control means, for receiving said height dimension data from said means for determining the particular height dimension of a particular one of the plurality of cigarette cartons, and for controlling said single actuator means for adjusting the elevational disposition of said means defining said support surface upon which the plurality of cigarette cartons are adapted to be movably supported as the plurality of cigarette cartons are conveyed along said processing line from one of said plurality of operational stations to another one of said plurality of operational stations, comprises a programmable logic controller (PLC) operatively connected to said sensor means, said second sensor, and said single actuator means for automatically adjusting the elevational disposition of said means defining said support surface, for receiving a signal from said second sensor indicating the presence of the particular one of the plurality of cigarette cartons at said cigarette carton height determination station, for activating said sensor means so as to determine the height dimension of the particular one of the plurality of cigarette cartons present at said cigarette carton height determination station, for receiving the height dimension data characteristic of the particular one of the plurality of cigarette cartons present at said cigarette carton height determination station, and for controlling said single actuator means for automatically adjusting the elevational disposition of said means defining said support surface in accordance with said height dimension data characteristic of the particular one of the plurality of cigarette cartons present at said cigarette carton height determination station whereby the plurality of cigarette cartons will be properly positioned with respect to said plurality of operational components respectively disposed at said plurality of operational stations when the plurality of cigarette cartons are disposed at said plurality of operational stations.

4. The apparatus as set forth in claim 3, further comprising:

at least one gate member pivotally disposed at said cigarette carton height determination station for movement between a first CLOSED position at which movement of the plurality of cigarette cartons beyond said cigarette carton height determination station is prevented so as to permit said sensor means to determine the height dimension of the particular one of the plurality of cigarette cartons present at said cigarette carton height determination station, and a second OPENED position at which movement of the plurality of cigarette cartons beyond said cigarette carton height determination station is permitted after said sensor means has determined the height dimension of the particular one of the plurality of cigarette cartons present at said cigarette carton height determination station.

5. The apparatus as set forth in claim 4, further comprising:

a cigarette carton loading station disposed downstream from said cigarette carton height determination station and comprising means for detecting the presence of a cigarette carton at said cigarette carton loading station;

said program logic controller (PLC) being operatively connected to said detecting means of said cigarette carton loading station for moving said at least one gate member to said CLOSED position if the presence of a cigarette carton is not detected at said cigarette carton loading station within a predetermined period of time.

6. The apparatus as set forth in claim 5, further comprising:

an accessory drive shaft operatively connected to said plurality of operational components disposed at said plurality of operational stations; and a drive motor operatively connected to both said conveyor means and said accessory drive shaft;

said detecting means of said cigarette carton loading station being operatively connected to said drive motor for energizing said drive motor when the presence of a cigarette carton at said cigarette carton loading station is detected, and for de-energizing said drive motor when the presence of a cigarette carton is not detected within a predetermined period of time.

7. The apparatus as set forth in claim 1, wherein:

one of said plurality of operational stations comprises a cigarette package stamp applicator station for applying tax stamps to the plurality of cigarette packages contained within each one of the plurality of cigarette cartons;

means is provided for opening each one of the plurality of cigarette cartons at a position upstream of said tax stamp applicator station so as to expose the cigarette packages contained within each one of the plurality of cigarette cartons in preparation for having tax stamps applied to the cigarette packages contained with each one of the plurality of cigarette cartons at said cigarette package tax stamp applicator station; and means is provided for closing each one of the plurality of cigarette cartons at a position downstream of said tax stamp applicator station so as to re-seal each one of the plurality of cigarette cartons after the tax stamps have been applied to the cigarette packages contained with each one of the plurality of cigarette cartons at said cigarette package tax stamp applicator station.

8. The apparatus as set forth in claim 7, wherein said means for closing each one of the plurality of cigarette cartons at a position downstream of said tax stamp applicator station comprises:

a cigarette carton top flap member closing station at which a smaller one of the top flap members of each cigarette carton is folded over the cigarette packages disposed within each cigarette carton, the larger one of the top flap members of each cigarette carton being disposed in a vertically upright orientation;

a cigarette carton top flap sealing station, disposed downstream from said cigarette carton top flap member closing station, for applying adhesive material to the vertically oriented larger one of the top flap members of each cigarette carton and for folding the larger one of the top flap members of each cigarette carton onto the folded smaller one of the top flap members of each cigarette carton; and a curing station, disposed downstream from said cigarette carton top flap sealing station, for maintaining the larger top flap member of each cigarette carton folded onto the smaller top flap member of each cigarette carton so as to ensure the adhesive bonding of the larger top flap member of each cigarette carton to the smaller top flap member of each cigarette carton.

9. The apparatus as set forth in claim 8, wherein:

said cigarette carton top flap member closing station comprises a pair of camming rod members for respectively engaging the larger and smaller top flap members of each cigarette carton;

said cigarette carton top flap sealing station comprises an adhesive gun for dispensing adhesive material onto an undersurface portion of the larger top flap member of each cigarette carton, and a crank arm mechanism for folding the larger top flap member of each cigarette carton onto the folded smaller top flap member of each cigarette carton; and said curing station comprises a seal maintenance box through which each one of the cigarette cartons is conveyed.

10. The apparatus as set forth in claim 7, wherein said stamp applicator station comprises:

means for holding a roll of tax stamp paper upon which a predetermined row and column array of tax stamps is disposed;

a tax stamp applicator comprising a plurality of longitudinally spaced stamping shoes for engaging predeterminedly spaced ones of the tax stamps disposed within the predetermined array of rows and columns upon the roll of tax stamp paper; and means for linearly moving said tax stamp applicator in a longitudinal direction, with respect to said cigarette package tax stamp applicator station and in predetermined incremental steps, such that said longitudinally spaced stamping shoes can engage predetermined sets of the predeterminedly spaced tax stamps each time said tax stamp applicator is incrementally moved one step whereby a predetermined number of the plurality of different cigarette cartons can have tax stamps, from the rowsof tax stamps disposed upon the tax stamp paper, applied to their cigarette packages before the tax stamp paper must be advanced so as to present new rows of tax stamps, of the row and column array of tax stamps, to said stamping shoes of said tax stamp applicator.

11. The apparatus as set forth in claim 7, wherein said means for opening each one of the plurality of cigarette cartons at a position upstream of said tax stamp applicator station comprises:

a cigarette carton top flap member unsealing station at which an adhesive bond defined between the overlapped top flap members of each cigarette carton is broken such that the top flap members are disposed at partially opened positions with respect to each other; and a cigarette carton top flap opening station, disposed downstream from said cigarette carton top flap member unsealing station for opening the partially opened top flap members of each cigarette carton to fully opened positions with respect to each other.

12. The apparatus as set forth in claim 11, wherein said cigarette carton top flap opening station comprises:

a plow member for disposition beneath the partially opened top flap members of each cigarette carton; and outwardly flared members integral with said plow member for forcing the partially opened top flap members to fully opened positions as the cigarette carton is moved relative to said outwardly flared members by said conveyor means.

13. The apparatus as set forth in claim 12, wherein said cigarette carton top flap member unsealing station comprises:

means for initially causing a larger one of the top flap members of each cigarette carton to be separated from a smaller one of the top flap members of each cigarette carton so as to define a space therebetween; and cutter means for insertion into the space defined between the separated large and smaller top flap members of each cigarette carton for severing the adhesive bond securing the larger and smaller top flap members of each cigarette carton together.

14. The apparatus as set forth in claim 13, wherein said means for separating the larger one of the top flap members from the smaller one of the top flap members comprises:

at least one of an air nozzle for blowing pressurized air between the larger and smaller top flap members of each cigarette carton, and a suction cup for applying vacuum to the larger top flap member of each cigarette carton.

15. The apparatus as set forth in claim 1, further comprising:

access doors pivotally disposed adjacent to said support surface upon which the plurality of cigarette cartons are adapted to be movably supported so as to confine the plurality of cigarette cartons upon said support surface when said access doors are disposed in vertically oriented LOCKED positions, and for permitting access to the plurality of cigarette cartons disposed at said plurality of operational stations when said access doors are disposed in lowered RELEASED positions.

16. A method of applying tax stamps onto cigarette packages disposed within cigarette cartons which have predeterminedly different height dimensions, comprising the steps of:

providing a plurality of operational stations which are longitudinally spaced from each other along a longitudinally extending processing line and which respectively comprise a plurality of operational components for respectively performing a plurality of operations upon each one of a plurality of different cigarette cartons having different height dimensions;

providing a support surface, extending along said longitudinally extending processing line, upon which the plurality of different cigarette cartons, having the different height dimensions, are adapted to be movably supported along said processing line from one of said plurality of operational stations to another one of said plurality of operational stations;

providing a single actuator means for adjusting the elevational disposition of said support surface upon which the plurality of different cigarette cartons, having the different height dimensions, are adapted to be movably supported along said processing line from one of said plurality of operational stations to another one of said plurality of operational stations;

moving a contact member into engagement with an upper per surface portion of a particular one of the plurality of cigarette cartons, having the different height dimensions, when the particular one of the plurality of cigarette cartons, having the different height dimensions, is disposed at said cigarette carton height determination station;

using a sensor, disposed at said cigarette carton height determination station, to sense the distance of said contact member, disposed in contact with the upper surface portion of the particular one of the plurality of different cigarette cartons, having the different height dimensions, which is disposed at said cigarette carton height determination station, from said sensor so as to therefore determine the particular height dimension of the particular one of the plurality of cigarette cartons, having the different height dimensions, disposed at said cigarette carton height determination station;

generating data, from said sensor disposed at said cigarette height determination station, indicative of the particular height dimension of the particular one of the plurality of different cigarette cartons, having the different height dimensions, which is disposed at said cigarette carton height determination station;

controlling said single actuator means, in accordance with said height dimension data characteristic of the particular one of the plurality of different cigarette cartons, having the different height dimensions, as determined by said sensor disposed at said cigarette carton height determination station, so as to adjust the elevational disposition of said support surface, upon which the plurality of different cigarette cartons, having the different height dimensions, are adapted to be movably supported along said processing line from one of said plurality operational stations to another one of said plurality of operational stations, such that the plurality of different cigarette cartons, having the different height dimensions, are always disposed at a predeterminedly correct elevational level with respect to said plurality of operational components respectively disposed at said plurality of operational stations whereby said operational components respectively disposed at said plurality of operational stations can properly perform their operations upon the plurality of different cigarette cartons, having the different height dimensions, regardless of the particular height dimension of the particular one of the plurality of different cigarette cartons having the different height dimensions; and serially conveying the plurality of cigarette cartons, having the different height dimensions, along said support surface in an intermittent cyclic manner for permitting each one of the plurality of different cigarette cartons, having the different height dimensions, to be periodically stopped at each one of the plurality of operational stations such that each one of said plurality of operational components, disposed at each one of said plurality of operational stations, can respectively perform their operations upon each one of the plurality of different cigarette cartons having the different height dimensions.

17. The method as set forth in claim 16, further comprising the steps of:

providing a programmable logic controller (PLC);

providing a second sensor at said cigarette carton height determination station for detecting the presence of the particular one of the plurality of cigarette cartons at said cigarette carton height determination station;

operatively connecting said programmable logic controller (PLC) to said sensor, said second sensor, and said single actuator means for adjusting the elevational disposition of said support surface;

transmitting a first signal from said second sensor to said program logic controller (PLC) indicating the presence of the particular one of the plurality of cigarette cartons at said cigarette carton height determination station;

transmitting a second signal from said program logic controller (PLC) to said sensor for activating said sensor so as to determine the height dimension of the particular one of the plurality of cigarette cartons present at said cigarette carton height determination station;

transmitting height dimension data, characteristic of the particular one of the plurality of cigarette cartons present at said cigarette carton height determination station, from said sensor to said program logic controller (PLC); and transmitting a signal from said program logic controller (PLC) to said single actuator means so as to adjust the elevational disposition of said support surface in accordance with said height dimension data, characteristic of the particular one of the plurality of cigarette cartons present at said cigarette carton height determination station, as transmitted by said sensor to said program logic controller (PLC), whereby the plurality of cigarette cartons will be properly positioned with respect to said plurality of operational components respectively disposed at said plurality of operational stations when the plurality of cigarette cartons are disposed at said plurality of operational stations.

18. The method as set forth in claim 17, further comprising the steps of:

providing at least one pivotal gate member at said cigarette carton height determination station for movement between a first CLOSED position at which movement of the plurality of cigarette cartons beyond said cigarette carton height determination station is prevented so as to permit said sensor to determine the height dimension of the particular one of the plurality of cigarette cartons present at said cigarette carton height determination station, and a second OPENED position at which movement of the plurality of cigarette cartons beyond said cigarette carton height determination station is permitted after said sensor has determined the height dimension of the particular one of the plurality of cigarette cartons present at said cigarette carton height determination station;

providing a cigarette carton loading station downstream from said cigarette carton height determination station;

detecting the presence of a cigarette carton at said cigarette carton loading station;

transmitting a signal from said program logic controller (PLC) to said at least one gate member so as to move said at least one gate member to said OPENED position in response to receiving said height dimension data from said second sensor, to maintain said at least one gate member at said OPENED position as long as the presence of a cigarette carton is detected at said cigarette carton loading station, and to move said at least one gate member to said CLOSED position if the presence of a cigarette carton is not detected at said cigarette carton loading station within a predetermined period of time.

19. The method as set forth in claim 18, further comprising the steps of:

providing an accessory drive shaft for operative connection to said plurality of operational components disposed at said plurality of operational stations;

providing a drive motor for operative connection to both said conveyor means and said accessory drive shaft; and energizing said drive motor when the presence of a cigarette carton at said cigarette carton loading station is detected, and de-energizing said drive motor when the presence of a cigarette carton is not detected within a predetermined period of time.

20. The method as set forth in claim 16, further comprising the steps of:

providing a cigarette package tax stamp applicator station, comprising a tax stamp applicator, for applying tax stamps to the plurality of cigarette packages contained within each one of the plurality of cigarette cartons;

severing the bond defined between the top flap members of each one of the plurality of cigarette cartons at a cigarette carton top flap member unsealing station disposed upstream of said cigarette package stamp applicator station so as to dispose the top flap members of each one of the plurality of cigarette cartons at a partially opened position;

using a plow member at a cigarette carton top flap member opening station disposed downstream from said cigarette carton top flap member unsealing station for opening the top flap members of each one of the plurality of cigarette cartons to a fully opened position so as to expose the cigarette packages contained within each one of the plurality of cigarette cartons in preparation for having tax stamps applied to the cigarette packages contained with each one of the plurality of cigarette cartons at said cigarette package tax stamp applicator station;

folding a smaller one of the top flap members of each one of the plurality of cigarette cartons, to a position overlying the cigarette packages contained within each one of the plurality of cigarette cartons, and orienting a larger one of the top flap members of each one of the plurality of cigarette cartons to a vertically upright position at a top flap member folding station disposed downstream from said tax stamp applicator station; and applying an adhesive material to the vertically upright larger top flap member of each one of the plurality of cigarette cartons and folding the larger top flap member of each one of the plurality of cigarette cartons onto the folded smaller top flap member of each one of the plurality of cigarette cartons so as to re-seal each one of the plurality of cigarette cartons at a cigarette carton top flap re-sealing station disposed downstream from said top flap member folding station.

21. The method as set forth in claim 20, further comprising the steps of:

providing a paper roll holder at said cigarette package tax stamp applicator station for holding a roll of tax stamp paper upon which a predetermined row and column array of tax stamps is disposed;

providing a plurality of longitudinally spaced stamping shoes upon said tax stamp applicator disposed at said cigarette package tax stamp application station for engaging predeterminedly spaced ones of the tax stamps disposed in the predetermined array of rows and columns upon the roll of tax stamp paper; and longitudinally moving said tax stamp applicator in a linear manner, with respect to said cigarette package tax stamp application station and in predetermined incremental steps, such that said longitudinally spaced stamping shoes can engage predetermined sets of the predeterminedly spaced tax stamps each time said tax stamp applicator is incrementally moved one step whereby a predetermined number of the plurality of cigarette cartons can have tax stamps from the rows of tax stamps disposed upon the tax stamp paper applied to their cigarette packages before the tax stamp paper must be advanced so as to present new rows of tax stamps of the row and column array of tax stamps to said stamping shoes of said tax stamp applicator.

22. The method as set forth in claim 20, further comprising the steps of:

equally spacing said operational stations apart from each other by a predetermined distance; and cyclically conveying the plurality of cigarette cartons in an intermittent manner so as to serially convey the plurality of cigarette cartons from one operational station to another operational station such that when a first one the plurality of cigarette cartons is disposed at a particular one of the plurality of operational stations, other ones of the plurality of cigarette cartons are disposed at other ones of said operational stations.

23. The method as set forth in claim 22, further comprising the step of:

achieving said application of said adhesive material to the vertically upright larger top flap member of each one of the plurality of cigarette cartons, and said folding of the larger top flap member of each one of the plurality of cigarette cartons onto the folded smaller top flap member of each one of the plurality of cigarette cartons, within a single operational cyclic conveying movement.

24. The method as set forth in claim 16, further comprising the step of:

providing pivotal access doors adjacent to said support surface upon which the plurality of cigarette cartons are adapted to be movably supported so as to confine the plurality of cigarette cartons upon said support surface when said access doors are disposed in vertically raised LOCKED positions, and for permitting access to the plurality of cigarette cartons disposed at said plurality of operational stations when said access doors are disposed in vertically lowered RELEASED positions.

25. Apparatus for applying tax stamps onto cigarette packages disposed Within cigarette cartons which have prede terminedly different height dimensions, comprising:

a plurality of operational stations, longitudinally spaced from each other along a longitudinally extending processing line, respectively comprising a plurality of operational components for respectively performing a plurality of operations upon each one of a plurality of cigarette cartons having the different height dimensions;

a support surface, extending along said longitudinally extending processing line, upon which the plurality of cigarette cartons, having the different height dimensions, are adapted to be movably supported;

a conveyor for serially conveying the plurality of cigarette cartons, having the different height dimensions, along said support surface in an intermittent cyclic manner for permitting each one of the plurality of cigarette cartons, having the different height dimensions, to be periodically stopped at each one of the plurality of operational stations such that each one of said plurality of operational components disposed at each one of said plurality of operational stations can respectively perform its operations upon each one of the plurality of cigarette cartons having the different height dimensions;

a contact member movably disposed at a cigarette carton height determination station for movement into engagement with an upper surface portion of a particular one of the plurality of cigarette cartons, having the different height dimensions, when the particular one of the plurality of cigarette cartons, having the different height dimensions, is disposed at said cigarette carton height determination station;

sensor means, disposed at said cigarette carton height determination station, for sensing the distance of said contact member, disposed in contact with the upper surface portion of the particular one of the plurality of different cigarette cartons, having the different height dimensions, which is disposed at said cigarette carton height determination station, from said sensor means and therefore for determining the particular height dimension of the particular one of the plurality of cigarette cartons, having the different height dimensions, disposed at said cigarette carton height determination station, and for generating data indicative of the particular height dimension of the particular one of the plurality of different cigarette cartons, having the different height dimensions, which is disposed at said cigarette carton height determination station;

a single actuator for adjusting the elevational disposition of said support surface upon which the plurality of cigarette cartons, having the different height dimensions, are adapted to be movably supported as the plurality of cigarette cartons, having the different height dimensions, are conveyed along said processing line from one of said plurality of operational stations to another one of said plurality of operational stations; and a controller for receiving said height dimension data from said sensor for determining the particular height dimension of the particular one of the plurality of different cigarette cartons, having the different height dimensions, which is disposed at said cigarette carton height determination station, and for controlling said single actuator so as to adjust the elevational disposition of said support surface, upon which the plurality of different cigarette cartons, having the different height dimensions, are adapted to be movably supported as the plurality of different cigarette cartons, having the different height dimensions, are conveyed along said processing line from one of said plurality of operational stations to another one of said plurality of operational stations, in accordance with said height dimension data, as determined by said sensor disposed at said cigarette carton height determination station, characteristic of the particular one of the plurality of different cigarette cartons, having the different height dimensions, disposed at said cigarette carton height determination station, such that the plurality of different cigarette cartons, having the different height dimensions, are always disposed at predeterminedly correct elevational levels with respect to said plurality of operational components respectively disposed at said plurality of operational stations whereby said operational components respectively disposed at said plurality of operational stations can properly perform their operations upon the plurality of different cigarette cartons, having the different height dimensions, regardless of the particular height dimension of the particular one of the plurality of different cigarette cartons having the different height dimensions.

26. The apparatus as set forth in claim 25, wherein:

said single actuator for adjusting said elevational disposition of said support surface, upon which the plurality of cigarette cartons are adapted to be movably supported as the plurality of cigarette cartons are conveyed along said processing line from one of said plurality of operational stations to another one of said plurality of operational stations, comprises a single servo mechanism and linear actuator assembly.

27. The apparatus as set forth in claim 25, wherein:

said contact member comprises a horizontally oriented plate which is vertically movable in a reciprocating manner so as to be movable into contact with the upper surface portions of different cigarette cartons having different height dimensions;

said sensor means comprises an ultrasonic sensor for sensing the positional disposition of said horizontally oriented plate;

a second sensor is disposed at said cigarette carton height determination station for detecting the presence of the particular one of the plurality of cigarette cartons at said cigarette carton height determination station; and said controller, for receiving said height dimension data from said sensor for determining the particular height dimension of a particular one of the plurality of cigarette cartons, and for controlling said single actuator for adjusting the elevational disposition of said support surface upon which the plurality of cigarette cartons are adapted to be movably supported as the plurality of cigarette cartons are conveyed along said processing line from one of said plurality of operational stations to another one of said plurality of operational stations, comprises a programmable logic controller (PLC) operatively connected to said sensor means, said second sensor, and said single actuator for automatically adjusting the elevational disposition of said support surface, for receiving a signal from said second sensor indicating the presence of the particular one of the plurality of cigarette cartons at said cigarette carton height determination station, for activating said sensor means so as to determine the height dimension of the particular one of the plurality of cigarette cartons present at said cigarette carton height determination station, for receiving the height dimension data characteristic of the particular one of the plurality of cigarette cartons present at said cigarette carton height determination station, and for controlling said single actuator means for automatically adjusting the elevational disposition of said support surface in accordance with said height dimension data characteristic of the particular one of the plurality of cigarette cartons present at said cigarette carton height determination station whereby the plurality of cigarette cartons will be properly positioned with respect to said plurality of operational components respectively disposed at said plurality of operational stations when the plurality of cigarette cartons are disposed at said plurality of operational stations.

28. The apparatus as set forth in claim 27, further comprising:

at least one gate member pivotally disposed at said cigarette carton height determination station for movement between a first CLOSED position at which movement of the plurality of cigarette cartons beyond said cigarette carton height determination station is prevented so as to permit said sensor means to determine the height dimension of the particular one of the plurality of cigarette cartons present at said cigarette carton height determination station, and a second OPENED position at which movement of the plurality of cigarette cartons beyond said cigarette carton height determination station is permitted after said sensor means has determined the height dimension of the particular one of the plurality of cigarette cartons present at said cigarette carton height determination station.

29. The apparatus as set forth in claim 28, further comprising:

a cigarette carton loading station disposed downstream from said cigarette carton height determination station and comprising a detector for detecting the presence of a cigarette carton at said cigarette carton loading station;

said program logic controller (PLC) being operatively connected to said detector of said cigarette carton loading station for moving said at least one gate member to said CLOSED position if the presence of a cigarette carton is not detected at said cigarette carton loading station within a predetermined period of time.

30. The apparatus as set forth in claim 29, further comprising:

an accessory drive shaft operatively connected to said plurality of operational components disposed at said plurality of operational stations; and a drive motor operatively connected to both said conveyor and said accessory drive shaft;

said detector of said cigarette carton loading station being operatively connected to said drive motor for energizing said drive motor when the presence of a cigarette carton at said cigarette carton loading station is detected, and for deenergizing said drive motor when the presence of a cigarette carton is not detected within a predetermined period of time.

31. The apparatus as set forth in claim 25, wherein:

one of said plurality of operational stations comprises a cigarette package stamp applicator station for applying tax stamps to the plurality of cigarette packages contained within each one of the plurality of cigarette cartons;

an opening mechanism is provided for opening each one of the plurality of cigarette cartons at a position upstream of said tax stamp applicator station so as to expose the cigarette packages contained within each one of the plurality of cigarette cartons in preparation for having tax stamps applied to the cigarette packages contained with each one of the plurality of cigarette cartons at said cigarette package tax stamp applicator station; and a closing mechanism is provided for closing each one of the plurality of cigarette cartons at a position downstream of said tax stamp applicator station so as to reseal each one of the plurality of cigarette cartons after the tax stamps have been applied to the cigarette packages contained with each one of the plurality of cigarette cartons at said cigarette package tax stamp applicator station.

32. The apparatus as set forth in claim 31, wherein said closing mechanism for closing each one of the plurality of cigarette cartons at a position downstream of said tax stamp applicator station comprises:

a cigarette carton top flap member closing station at which a smaller one of the top flap members of each cigarette carton is folded over the cigarette packages disposed within each cigarette carton, the larger one of the top flap members of each cigarette carton being disposed in a vertically upright orientation;

a cigarette carton top flap sealing station, disposed downstream from said cigarette carton top flap member closing station, for applying adhesive material to the vertically oriented larger one of the top flap members of each cigarette carton and for folding the larger one of the top flap members of each cigarette carton onto the folded smaller one of the top flap members of each cigarette carton; and a curing station, disposed downstream from said cigarette carton top flap sealing station, for maintaining the larger top flap member of each cigarette carton folded onto the smaller top flap member of each cigarette carton so as to ensure the adhesive bonding of the larger top flap member of each cigarette carton to the smaller top flap member of each cigarette carton.

33. The apparatus as set forth in claim 32, wherein:

said cigarette carton top flap member closing station comprises a pair of camming rod members for respectively engaging the larger and smaller top flap members of each cigarette carton;

said cigarette carton top flap sealing station comprises an adhesive gun for dispensing adhesive material onto an undersurface portion of the larger top flap member of each cigarette carton, and a crank arm mechanism for folding the larger top flap member of each cigarette carton onto the folded smaller top flap member of each cigarette carton; and said curing station comprises a seal maintenance box through which each one of the cigarette cartons is conveyed.

34. The apparatus as set forth in claim 31, wherein said stamp applicator station comprises:

a holder for holding a roll of tax stamp paper upon which a predetermined row and column array of tax stamps is disposed;

a tax stamp applicator comprising a plurality of longitudinally spaced stamping shoes for engaging predeterminedly spaced ones of the tax stamps disposed within the predetermined array of rows and columns upon the roll of tax stamp paper; and an actuator for linearly moving said tax stamp applicator in a longitudinal direction, with respect to said cigarette package tax stamp applicator station and in predetermined incremental steps, such that said longitudinally spaced stamping shoes can engage predetermined sets of the predeterminedly spaced tax stamps each time said tax stamp applicator is incrementally moved one step whereby a predetermined number of the plurality of different cigarette cartons can have tax stamps, from the rows of tax stamps disposed upon the tax stamp paper, applied to their cigarette packages before the tax stamp paper must be advanced so as to present new rows of tax stamps, of the row and column array of tax stamps, to said stamping shoes of said tax stamp applicator.

35. The apparatus as set forth in claim 31, wherein said opening mechanism for opening each one of the plurality of cigarette cartons at a position upstream of said tax stamp applicator station comprises:

a cigarette carton top flap member unsealing station at which an adhesive bond defined between the overlapped top flap members of each cigarette carton is broken such that the top flap members are disposed at partially opened positions with respect to each other; and a cigarette carton top flap opening station, disposed downstream from said cigarette carton top flap member unsealing station for opening the partially opened top flap members of each cigarette carton to fully opened positions with respect to each other.

36. The apparatus as set forth in claim 35, wherein said cigarette carton top flap opening station comprises:

a plow member for disposition beneath the partially opened top flap members of each cigarette carton; and outwardly flared members integral with said plow member for forcing the partially opened top flap members to fully opened positions as the cigarette carton is moved relative to said outwardly flared members by said conveyor.

37. The apparatus as set forth in claim 35, wherein said cigarette carton top flap member unsealing station comprises:

structure for initially causing a larger one of the top flap members of each cigarette carton to be separated from a smaller one of the top flap members of each cigarette carton so as to define a space therebetween; and a cutter for insertion into the space defined between the separated larger and smaller top flap members of each cigarette carton for severing the adhesive bond securing the larger and smaller top flap members of each cigarette carton together.

38. The apparatus as set forth in claim 37, wherein said structure for separating the larger one of the top flap members from the smaller one of the top flap members comprises:

at least one of an air nozzle for blowing pressurized air between the larger and smaller top flap members of each cigarette carton, and a suction cup for applying vacuum to the larger top flap member of each cigarette carton.

39. The apparatus as set forth in claim 25, further comprising:

access doors pivotally disposed adjacent to said support surface upon which the plurality of cigarette cartons are adapted to be movably supported so as to confine the plurality of cigarette cartons upon said support surface when said access doors are disposed in vertically oriented LOCKED positions, and for permitting access to the plurality of cigarette cartons disposed at said plurality of operational stations when said access doors are disposed in lowered RELEASED positions.

* * * * *